(12) United States Patent
Takahashi

(10) Patent No.: US 10,735,789 B2
(45) Date of Patent: Aug. 4, 2020

(54) TRANSMITTING APPARATUS, RECEIVING APPARATUS, AND DATA PROCESSING METHOD

(71) Applicant: Saturn Licensing LLC, New York, NY (US)

(72) Inventor: Kazuyuki Takahashi, Chiba (JP)

(73) Assignee: Saturn Licensing LLC, New York, NY (US)

( * ) Notice: Subject to any disclaimer, the term of this patent is extended or adjusted under 35 U.S.C. 154(b) by 125 days.

(21) Appl. No.: 15/754,102

(22) PCT Filed: Oct. 13, 2016

(86) PCT No.: PCT/JP2016/080300
§ 371 (c)(1),
(2) Date: Feb. 21, 2018

(87) PCT Pub. No.: WO2017/073336
PCT Pub. Date: May 4, 2017

(65) Prior Publication Data
US 2018/0249191 A1 Aug. 30, 2018

(30) Foreign Application Priority Data
Oct. 27, 2015 (JP) .................. 2015-210476

(51) Int. Cl.
H04N 21/2383 (2011.01)
H04L 29/06 (2006.01)
(Continued)

(52) U.S. Cl.
CPC ...... H04N 21/2383 (2013.01); H04H 20/423 (2013.01); H04H 20/95 (2013.01);
(Continued)

(58) Field of Classification Search
CPC ........... H04N 21/2362; H04N 21/4345; H04N 21/2383; H04N 21/4382; H04N 21/23614;
(Continued)

(56) References Cited

U.S. PATENT DOCUMENTS

2012/0307842 A1* 12/2012 Petrov .............. H04N 21/23608
370/474
2012/0314762 A1 12/2012 Herrmann et al.
(Continued)

FOREIGN PATENT DOCUMENTS

CN 103856295 A 6/2014
EP 2 618 563 A2 7/2013
(Continued)

OTHER PUBLICATIONS

Extended Search Report dated Oct. 10, 2018 in European Patent Application No. 16859571.8.
(Continued)

Primary Examiner — Chirag R Patel
(74) Attorney, Agent, or Firm — Oblon, McClelland, Maier & Neustadt, L.L.P.

(57) ABSTRACT

A transmitting apparatus, a receiving apparatus, and a data processing method that enable efficient transmission of periodically transmitting information. The transmitting apparatus arranges, in a physical layer frame including a preamble and a data portion, periodically transmitting transmission information in an area that is extractable temporally before other information arranged in the data portion, and transmits the physical layer frame as a digital broadcast signal. The apparatuses and method are applicable to, for example, digital broadcasting using an IP transmission method.

12 Claims, 27 Drawing Sheets

(51) Int. Cl.
*H04H 20/42* (2008.01)
*H04L 5/00* (2006.01)
*H04L 1/00* (2006.01)
*H04N 21/643* (2011.01)
*H04H 20/95* (2008.01)

(52) U.S. Cl.
CPC .......... *H04L 1/0041* (2013.01); *H04L 1/0083* (2013.01); *H04L 5/0007* (2013.01); *H04L 29/06* (2013.01); *H04L 69/04* (2013.01); *H04N 21/64315* (2013.01)

(58) Field of Classification Search
CPC ........... H04N 21/238; H04N 21/26283; H04N 21/64315; H04N 21/64322; H04L 1/0041; H04L 1/0071; H04L 1/0045; H04L 1/0057; H04L 5/0053; H04L 5/0007; H04B 7/0413; H04W 28/06
See application file for complete search history.

(56) References Cited

U.S. PATENT DOCUMENTS

| | | | |
|---|---|---|---|
| 2013/0034032 A1* | 2/2013 | Vare | ........................ H04L 69/22 370/310 |
| 2013/0279380 A1 | 10/2013 | Hong et al. | |
| 2014/0185515 A1 | 7/2014 | Hong et al. | |
| 2015/0365917 A1 | 12/2015 | Hong et al. | |
| 2016/0212457 A1* | 7/2016 | Kwon | ..................... H04W 4/06 |
| 2016/0323059 A1 | 11/2016 | Herrmann et al. | |
| 2017/0034588 A1* | 2/2017 | Oh | ................... H04N 21/26258 |
| 2017/0324509 A1 | 11/2017 | Herrmann et al. | |

FOREIGN PATENT DOCUMENTS

| | | |
|---|---|---|
| JP | 2015-104122 A | 6/2015 |
| WO | WO 2009/044970 A1 | 4/2009 |
| WO | WO 2015/064942 A1 | 5/2015 |
| WO | WO 2015/075880 A1 | 5/2015 |

OTHER PUBLICATIONS

"Video Coding, Audio Coding, and Multiplexing Specifications for Digital Broadcasting", Association of Radio Industries and Businesses (ARIB) STD-B32 3.0, Jul. 31, 2014, pp. 1-506 (with partial English language translation).

* cited by examiner

FIG. 2

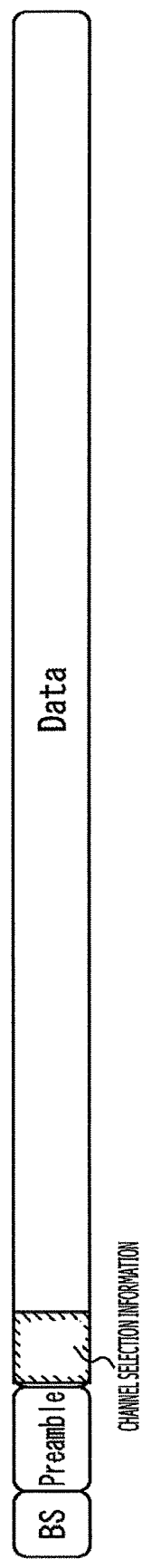
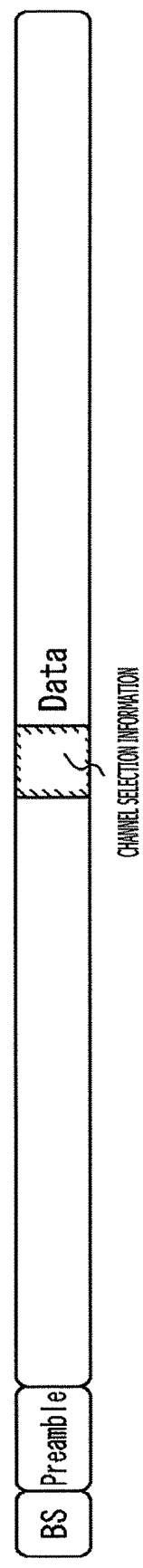
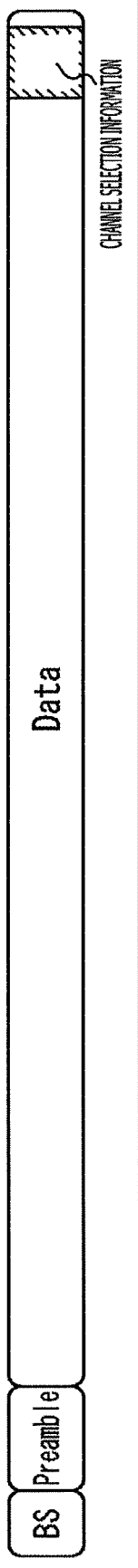

RELATIONSHIP BETWEEN POSITION OF CHANNEL SELECTION INFORMATION IN PHYSICAL LAYER FRAME AND CHANNEL SELECTION TIME
(IN CASE OF TRANSMITTING ONE PIECE OF CHANNEL SELECTION INFORMATION IN EACH PHYSICAL LAYER FRAME)

1) PRESENT AT BEGINNING OF PHYSICAL LAYER FRAME: CHANNEL SELECTION INFORMATION CAN BE ACQUIRED WITHOUT DELAY

2) PRESENT AT CENTER: DELAY OF HALF THE FRAME LENGTH => INFLUENCE ON CHANNEL SELECTION TIME IS MEDIUM

3) PRESENT AT END: DELAY OF FRAME LENGTH => INFLUENCE ON CHANNEL SELECTION TIME IS LARGE

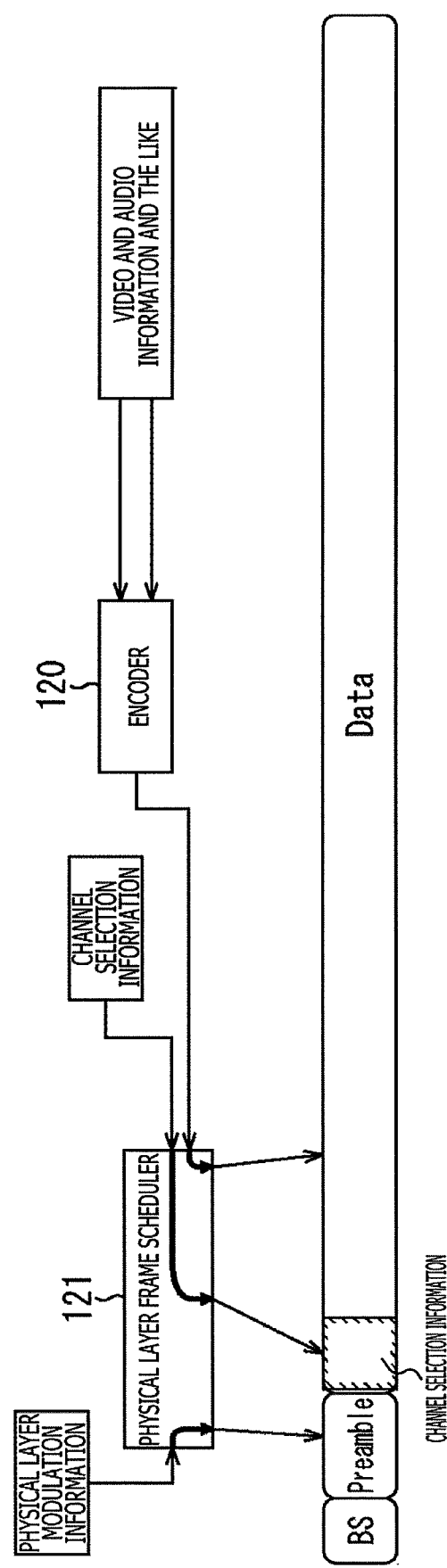

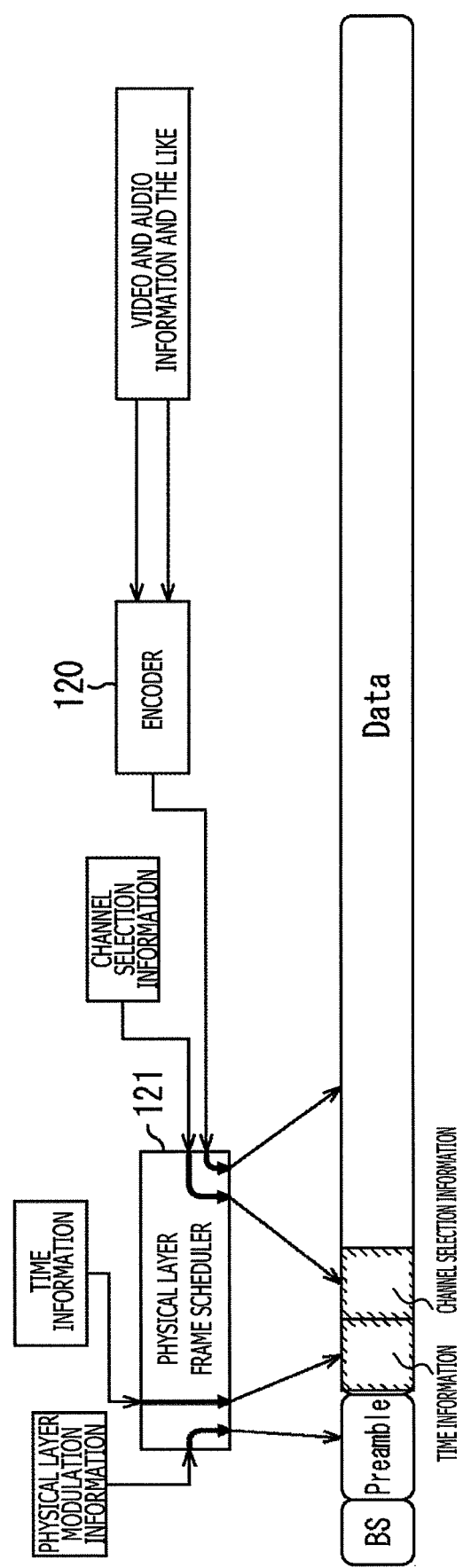

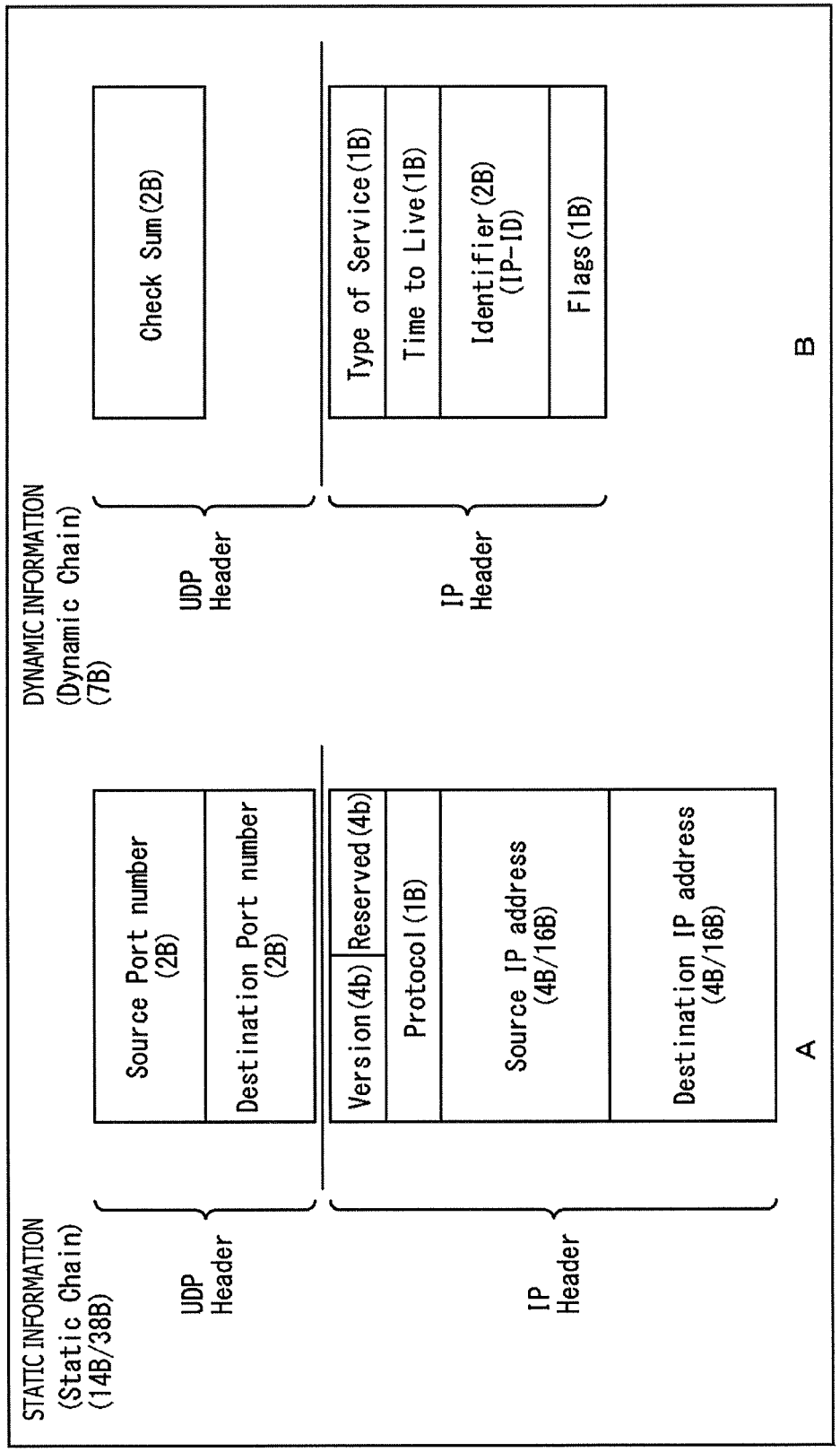

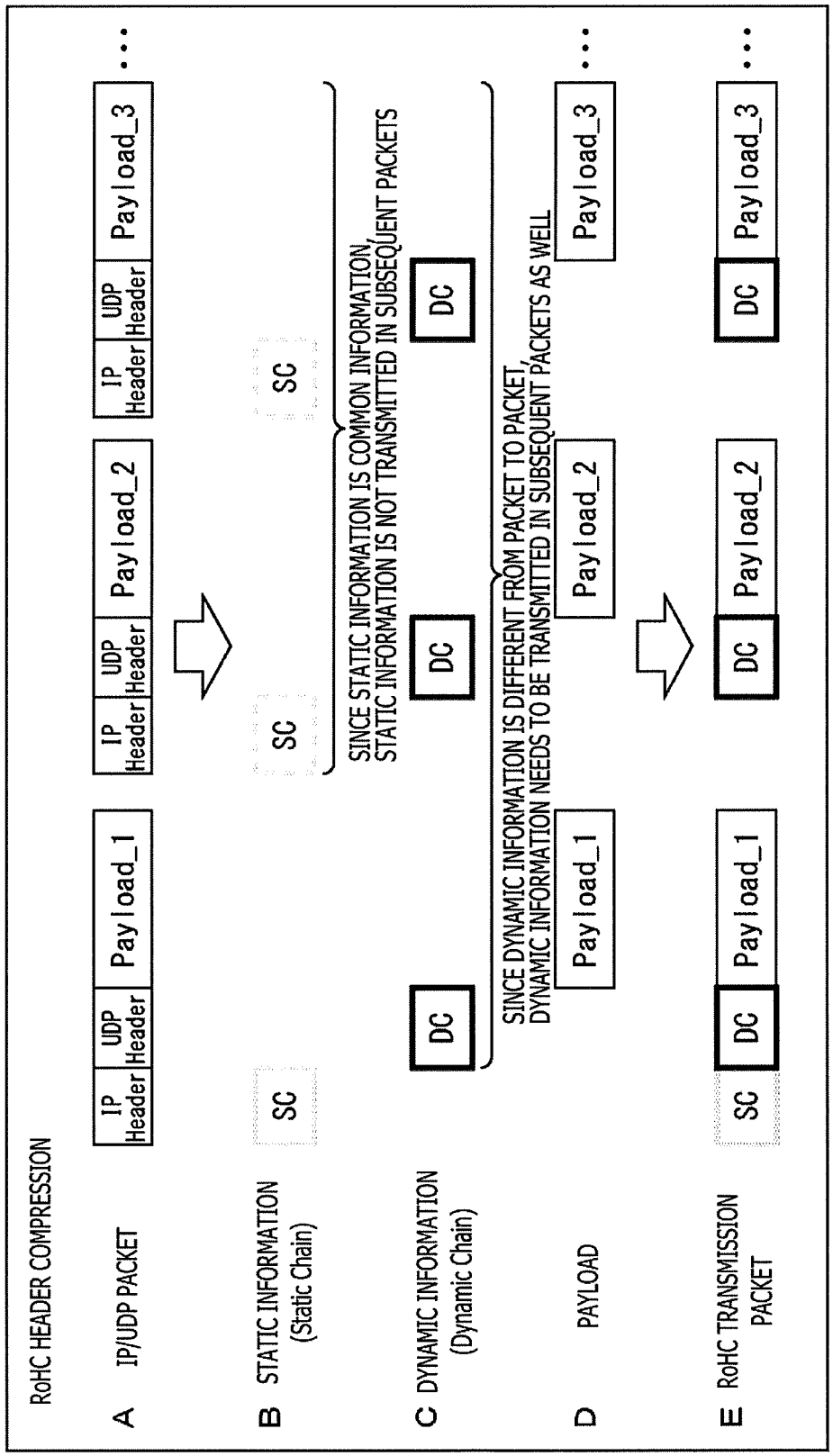

FIG. 8

| No | TRANSMISSION METHOD | LAYER | STORAGE LOCATION |
|---|---|---|---|
| 1 | IP/UDP PACKET TRANSMISSION METHOD | L3 | IP/UDP PACKET |
| 2 | L2 SIGNALING TRANSMISSION METHOD | L2 | L2 SIGNALING |
| 3 | L2 EXTENSION HEADER TRANSMISSION METHOD | L2 | L2 EXTENSION HEADER |
| 4 | L1 EXTENSION HEADER TRANSMISSION METHOD | L1 | L1 EXTENSION HEADER |
| 5 | L1 SIGNALING TRANSMISSION METHOD | L1 | L1 SIGNALING (PREAMBLE, BOOTSTRAP) |

FIG.15

| Packet Type Value | Meaning |
|---|---|
| 000 | IPv4 |
| 001 | Compressed IP Packet |
| 010 | MPEG-2 Transport Stream |
| 011 | Reserved |
| 100 | L2 Signaling |
| 101 | Reserved |
| 110 | Reserved |
| 111 | Extension |

FIG.18

| Packet Type Value | Meaning |
|---|---|
| 000 | IPv4 |
| 001 | Compressed IP Packet |
| 010 | MPEG-2 Transport Stream |
| 011 | Reserved |
| 100 | L2 Signaling |
| 101 | Reserved |
| 110 | Reserved |
| 111 | Extension |

TRANSMITTING APPARATUS, RECEIVING APPARATUS, AND DATA PROCESSING METHOD

TECHNICAL FIELD

The present technology relates to a transmitting apparatus, a receiving apparatus, and a data processing method, and particularly relates to a transmitting apparatus, a receiving apparatus, and a data processing method that enable efficient transmission of periodically transmitting information.

BACKGROUND ART

For example, it has been determined that the ATSC (Advanced Television Systems Committee) 3.0, which is one of the next-generation terrestrial broadcasting standards, will mainly employ IP/UDP, that is, the method of using IP (Internet Protocol) packets including UDP (User Datagram Protocol) packets (hereinafter referred to as an IP transmission method) for data transmission, instead of TS (Transport Stream) packets. Moreover, digital broadcasting standards other than ATSC 3.0 are also expected to employ the IP transmission method in the future.

Here, an IP packet (IP/UDP packet) including a UDP packet has a large overhead due to various information included in the header. Accordingly, there is RoHC (Robust Header Compression) defined in RFC 3095 by IETF (The Internet Engineering Task Force) as a technique for compressing the headers of IP/UDP packets for efficient transmission of the IP/UDP packets.

In the RoHC, a transmission packet (complete transmission packet) including all the header information of the IP header and the UDP header is transmitted, and information regarding the difference from the header information of the immediately preceding complete transmission packet is transmitted as the header information of the subsequent transmission packets.

As a method of compressing headers of IP/UDP packets, for example, an advanced BS (Broadcast Satellite) defines a technique for compressing the headers of the IP/UDP packets by which, like the RoHC, a complete transmission packet is transmitted and then an IP/UDP packet including information regarding the difference from the header information of the complete transmission packet in the header is transmitted (for example, refer to NPL 1).

In the digital broadcasting, moreover, the transmitting side needs to transmit, to the receiving side, channel selection information for selecting a service (channel assigned to a broadcasting station or the like) and time information for synchronizing the transmitting side and the receiving side.

CITATION LIST

Non Patent Literature

[NPL 1]
"ARIB STD-B32 Version 3.0," Association of Radio Industries and Businesses

SUMMARY

Technical Problem

As described above, digital broadcasting includes information that is transmitted periodically and repeatedly from the transmitting side to the receiving side, such as channel selection information, time information, and header compression information for header compression. Meanwhile, there have been demands for a proposal for efficient transmission of such periodically transmitting information.

The present technology has been made in view of the foregoing circumstances and enables efficient transmission of periodically transmitting information.

Solution to Problem

A transmitting apparatus according to a first aspect of the present technology includes a processing unit that arranges, in a physical layer frame including a preamble and a data portion, periodically transmitting transmission information in an area that is extractable temporally before other information arranged in the data portion, and a transmitting unit that transmits the physical layer frame as a digital broadcast signal.

The transmitting apparatus according to the first aspect of the present technology may be an independent apparatus or may be an internal block constituting one apparatus. Further, a data processing method according to the first aspect of the present technology is a data processing method corresponding to the above-described transmitting apparatus according to the first aspect of the present technology.

In the transmitting apparatus and the data processing method according to the first aspect of the present technology, periodically transmitting transmission information in a physical layer frame including a preamble and a data portion is arranged in an area that is extractable temporally before other information arranged in the data portion, and the physical layer frame is transmitted as a digital broadcast signal.

A receiving apparatus according to a second aspect of the present technology includes a receiving unit that receives a physical layer frame transmitted as a digital broadcast signal and including a preamble and a data portion, and a processing unit that performs a process corresponding to transmission information periodically transmitted and arranged in an area that is extractable temporally before other information arranged in the data portion in the physical layer frame.

The receiving apparatus according to the second aspect of the present technology may be an independent apparatus or may be an internal block constituting one apparatus. Further, a data processing method according to the second aspect of the present technology is a data processing method corresponding to the above-described receiving apparatus according to the second aspect of the present technology.

In the receiving apparatus and the data processing method according to the second aspect of the present technology, a physical layer frame transmitted as a digital broadcast signal and including a preamble and a data portion is received, and a process corresponding to transmission information periodically transmitted and arranged in an area that is extractable temporally before other information arranged in the data portion in the physical layer frame is performed.

Advantageous Effect of Invention

The first aspect and the second aspect of the present technology enable efficient transmission of periodically transmitting information.

Note that the effect described herein is not necessarily limitative, and any of the effects described in the present disclosure may be exhibited.

BRIEF DESCRIPTION OF DRAWINGS

FIG. 2 is a diagram illustrating a relationship between the position of channel selection information and channel selection time in a case where one piece of channel selection information is transmitted in each physical layer frame.

FIG. 3 is a diagram for describing arrangement of the channel selection information in an optimal position by a physical layer frame scheduler.

FIG. 4 is a diagram for describing arrangement of time information in an optimal position by the physical layer frame scheduler.

FIG. 5 is a diagram illustrating examples of static information (SC) and dynamic information (DC) in an IP header and a UDP header.

FIG. 6 is a diagram for describing an overview of RoHC header compression.

FIG. 8 is a diagram illustrating exemplary methods of transmitting periodic transmission information.

FIG. 15 is a diagram illustrating exemplary packet types.

FIG. 18 is a diagram illustrating exemplary packet types.

DESCRIPTION OF EMBODIMENT

The following describes an embodiment of the present technology with reference to the drawings. Note that the description will be made in the following order.
1. System Configuration
2. Overview of Periodic Transmission Information
  (1) Transmission of Channel Selection Information
  (2) Transmission of Time Information
  (3) Transmission of Header Compression Information
3. Methods of Transmitting Periodic Transmission Information
  (1) IP/UDP Packet Transmission Method
  (2) L2 Signaling Transmission Method
  (3) L2 Extension Header Transmission Method
  (4) L1 Extension Header Transmission Method
  (5) L1 Signaling Transmission Method
4. Configuration of Each Apparatus
5. Flow of Processes Executed by Each Apparatus
6. Modification
7. Computer Configuration

1. System Configuration (Exemplary Configuration of Transmission System)

Figure 1:
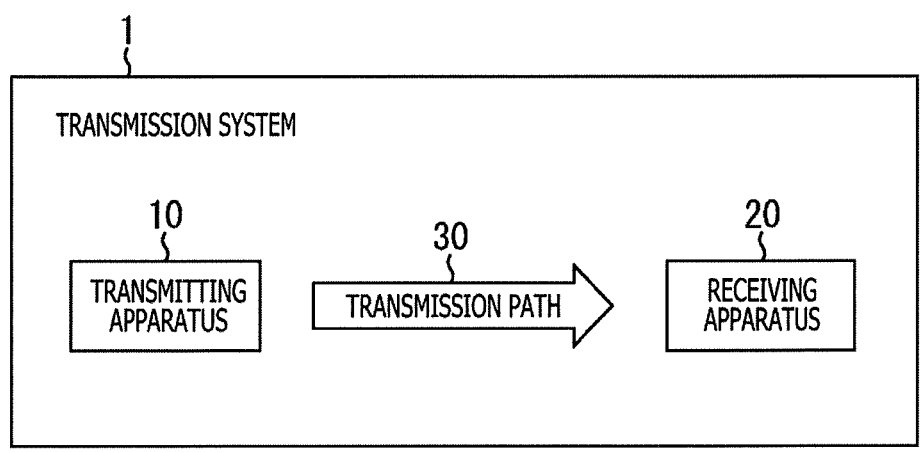
FIG. 1 is a diagram illustrating an exemplary configuration of a transmission system to which the present technology is applied.

FIG. 1 is a diagram illustrating a configuration of one embodiment of a transmission system to which the present technology is applied. Note that the system means a group of a plurality of apparatuses logically gathered.

In FIG. 1, a transmission system 1 includes a transmitting apparatus 10 and a receiving apparatus 20. The transmission system 1 performs data transmission conforming to the standard of digital broadcasting employing the IP transmission method such as ATSC 3.0.

The transmitting apparatus 10 is a transmitter conforming to the IP transmission method such as ATSC 3.0 and transmits content via a transmission path 30. For example, the transmitting apparatus 10 transmits a broadcast stream as a digital broadcast signal via the transmission path 30. The broadcast stream includes (components) such as a video and audio constituting the content of a television program or the like as well as signaling information.

The receiving apparatus 20 is a receiver conforming to the IP transmission method such as ATSC 3.0, and receives and outputs the content transmitted from the transmitting apparatus 10 via the transmission path 30. For example, the receiving apparatus 20 receives the digital broadcast signal from the transmitting apparatus 10, and processes the (components) such as the video and audio constituting the content as well as the signaling information included in the broadcast stream. The receiving apparatus 20 then reproduces the video and audio of the content of the television program or the like.

Note that in addition to ground waves (terrestrial broadcasting), the transmission path 30 in the transmission system 1 may be, for example, satellite broadcasting using broadcasting satellites (BSs: Broadcasting Satellites) or communications satellites (CSs: Communications Satellites), cable broadcasting using cables (CATV), or the like.

2. Overview of Periodic Transmission Information

Incidentally, in the digital broadcasting using the IP transmission method such as ATSC 3.0 or the like, information such as channel selection information for selecting a service (channel assigned to a broadcasting station or the like), time information for synchronizing the transmitting side and the receiving side, and header compression information for compressing packet header information is periodically and repeatedly transmitted. Further, as described above, there have been demands for a proposal for efficiently transmitting these pieces of periodically transmitting information (hereinafter referred to as periodic transmission information). Accordingly, hereinafter, description will be made with regard to the method of transmitting the periodic transmission information to respond to such demand.

(1) Transmission of Channel Selection Information

A physical layer frame structure used in ATSC 3.0, DVB-T2 (Digital Video Broadcasting-Second Generation Terrestrial), or the like has a length of 100 to 200 ms. In the physical layer frame, only after a preamble and a bootstrap are acquired, data in the subsequent data portion (preamble) can be acquired. Where the receiving apparatus 20 receives a digital broadcast signal having a predetermined frequency through a tuner, the receiving apparatus 20 outputs a physical layer frame. In a case where the receiving apparatus 20 acquires data in the middle of the physical layer frame structure, the receiving apparatus 20 discards the data until the next preamble appears. That is, the physical layer frame structure restricts the data acquisition timing at the receiving apparatus 20.

Here, the receiving apparatus 20 needs to acquire signaling information (for example, LLS (Link Layer Signaling) to be described later) including the channel selection information to select a service transmitted as a digital broadcast signal. However, since there is no guarantee where the channel selection information is arranged and, as described above, data is discarded when the data is acquired in the middle of the physical layer frame structure, it is required to reduce the data to be discarded as much as possible while reducing delay in channel selection time and speeding up the channel selection process. Note that for the MPEG2-TS (Transport Stream) method, the maximum value of the transmission interval of the service information (PSI/SI) is predetermined.

FIG. 2 is a diagram illustrating a relationship between the position of the channel selection information and the channel selection time in a case where one piece of channel selection information is transmitted in each physical layer frame.

In the upper row of FIG. 2, in a case where the channel selection information is arranged at the beginning (head) of the data portion of a physical layer frame, the receiving apparatus 20 can immediately acquire the channel selection information without delay after acquiring the preamble. In this case, the position of the channel selection information does not affect the channel selection time. Further, in the middle row of FIG. 2, in a case where the channel selection information is arranged at the center of the data portion of the physical layer frame, the receiving apparatus 20 can acquire the channel selection information after a delay of substantially half the frame length of the physical layer frame following the acquisition of the preamble. In this case, the influence of the position of the channel selection information of the channel selection time is larger than the case in the upper row of FIG. 2 (the degree of influence is "medium").

In the lower row of FIG. 2, in a case where the channel selection information is arranged at the end (tail) of the data portion of the physical layer frame, the receiving apparatus 20 can acquire the channel selection information after a delay of the frame length of the physical layer frame following the acquisition of the preamble. In this case, the influence of the position of the channel selection information of the channel selection time is much larger than the case in the middle row of FIG. 2 (the degree of influence is "large"). That is, in this case, the receiving apparatus 20 needs to wait for substantially the frame length before acquiring the channel selection information. Since the receiving apparatus 20 selects a service transmitted as a digital broadcast signal using the channel selection information, all of the data before the acquisition of the channel selection information is discarded.

As described above, where one piece of channel selection information is transmitted in each physical layer frame, the more the channel selection information is positioned rearward of the physical layer frame, the more amount of data is discarded and the larger the delay in channel selection time becomes.

Note that in a case where a plurality of pieces of channel selection information is included and transmitted in each physical layer frame, the number of pieces of channel selection information arranged in one physical layer frame increases and the period of transmitting the channel selection information is shortened. With this configuration, the receiving apparatus 20 can promptly acquire the channel selection information and the delay in channel selection time is expected to be improved. However, there is no guarantee that the channel selection information is arranged in an optimal position in the physical layer frame. Accordingly, compared to the case where the channel selection information is arranged at the beginning (head) of the data portion of the physical layer frame in the upper row of FIG. 2 described above, for example, there is a high possibility that the influence on the channel selection time remains.

Further, when a plurality of pieces of channel selection information is arranged in (the data portion of) one physical layer frame, the amount of data of the pieces of channel selection information that occupy the entire amount of data of the physical layer frame increases. This is likely to necessitate reduction in the amount of data of a video and audio that much. In this case, this results in, for example, deterioration in image quality and audio quality, affecting the video and audio data transmission. Further, the channel selection process can basically be performed as long as one piece of channel selection information is acquired. Therefore, the importance of the second and following pieces of channel selection information decreases.

Accordingly, in the physical layer frame to which the present technology is applied, the channel selection information is mapped to the head of the data portion to be subsequently transmitted immediately after the preamble and then transmitted. This enables the receiving apparatus 20 to promptly acquire the channel selection information from the physical layer frame, thereby shortening the channel selection time and speeding up the channel selection process.

Here, as illustrated in FIG. 3, a physical layer frame scheduler 121 in the transmitting apparatus 10 (FIG. 1) manages the timing at which data is arranged in the physical layer frame structure. That is, the physical layer frame scheduler 121 is capable of managing physical layer modulation information as well as video and audio data (data of components constituting content) encoded by an encoder 120 such that the physical layer modulation information and the video and audio data are arranged at predetermined positions of the physical layer frame. The physical layer modulation information serves as modulation information related to the physical layer. Specifically, the physical layer frame scheduler 121 arranges the physical layer modulation information in the preamble and the video and audio data in the data portion.

Then, the physical layer frame scheduler 121 in the transmitting apparatus 10 manages the channel selection information such that the channel selection information is arranged at the head of the data portion (payload) of the physical layer frame.

By arranging the channel selection information immediately after the preamble in the physical layer frame in this way, the receiving apparatus 20 can promptly acquire (extract) the channel selection information necessary for channel selection from the data portion after processing the preamble. This can shorten the channel selection time and speed up the channel selection process. Moreover, since the receiving apparatus 20 can extract the channel selection information just by the normal operation of extracting the data in the order from the head of the data portion after processing the preamble, there is no need to newly add a circuit or the like for extracting the channel selection information arranged at the head of the data portion of the physical layer frame.

(2) Transmission of Time Information

Digital broadcasting necessitates transmission of accurate time information in order to synchronize the transmitting apparatus 10 on the transmitting side and the receiving apparatus 20 on the receiving side. While a PCR (Program Clock Reference) is used as the time information in the MPEG2-TS method commonly used at present, time information such as, for example, a PTP (Precision Time Protocol) or an NTP (Network Time Protocol) is expected to be used in the IP transmission method such as ATSC 3.0. Further, here, information associated with the time information such as insertion or deletion of a leap second, information indicating daylight-saving time (summer time), or offset information from UTC (Coordinated Universal Time) transmitted by NTP from PTP may also be included.

PTP is information representing an 80-bit time defined in IEEE 1588-2008. The 80-bit PTP includes a seconds field having 48 bits and a nanoseconds field having 32 bits. Since a leap second is not inserted or deleted in the PTP, there is an advantage that the control thereof is easy. Further, in equipment to be connected to a network, NTP serves as a communication protocol for synchronizing a clock of the equipment with a correct time.

Here, the time information can be arranged as data in the preamble of a physical layer frame, an IP packet including a UDP packet (hereinafter also referred to as an IP/UDP packet), or the like. For example, in a case where the time information is arranged in an IP/UDP packet, this IP/UDP packet is arranged in the payload of an ALP (ATSC Link-layer Protocol) packet as a transmission packet, and then encapsulated (encapsulation).

Further, a plurality of ALP packets including this ALP packet (ALP packet including the time information) is arranged in the payload of a BB packet (Baseband Packet) and then encapsulated. Moreover, data acquired by scrambling a plurality of BB packets is mapped to an FEC frame, and a parity for error correction in the physical layer is added. Then, data acquired by performing a physical layer process such as bit-interleaving on a plurality of FEC frames is mapped to the data portion of the physical layer frame.

In this way, the time information such as PTP or NTP is mapped to the physical layer frame. However, since the IP/UDP packet, the ALP packet, the BB packet, and the FEC frame are sequentially multiplexed before the time information is mapped to the physical layer frame, this generates an error in the position at which time information is arranged due to the influence of jitter or the like.

That is, in digital broadcasting, although accurate time information needs to be transmitted for synchronization, there is no guarantee that the time information is mapped to an accurate position of the physical layer frame since the IP/UDP packet is multiplexed (multiplexing is repeated). When the time information error exceeds an allowable range, the precision of synchronization of the video and audio may become insufficient, for example. Therefore, an improvement thereof is required.

Accordingly, in the physical layer frame to which the present technology is applied, the time information is also mapped to the head of the data portion (payload) to be transmitted immediately after and subsequent to the preamble of the physical layer frame transmitted in a certain period so as to achieve highly-precise transmission of the time information.

Specifically, as illustrated in FIG. 4, the physical layer frame scheduler 121 in the transmitting apparatus 10 manages the time information such that the time information is arranged at the head of the data portion of the physical layer frame, as in the case of the channel selection information in FIG. 3. By arranging the time information immediately after the preamble in the physical layer frame in this way, the receiving apparatus 20 can promptly acquire (extract) the time information from the data portion after processing the preamble. This ensures synchronization (presentation synchronization) of the video and audio, for example.

Note that since it is possible to predict and arrange the time information to be transmitted well before the processing time needed by the physical layer frame scheduler 121, high precision can be secured. Further, in a case where the channel selection information and the time information are transmitted as the periodic transmission information, the time information is required to be more precise than the channel selection information. As illustrated in FIG. 4, therefore, it is desirable that the periodic transmission information is arranged in the order of the time information and the channel selection information in an area at the head of the data portion of the physical layer frame.

(3) Transmission of Header Compression Information

In digital broadcasting of the IP transmission method, an IP/UDP packet has a large overhead due to various information included in the header. Further, one technique for compressing the headers of IP/UDP packets for efficient transmission of the IP/UDP packets is RoHC defined in RFC 3095 by IETF.

For example, it is determined in ATSC 3.0 that RoHC defined in RFC 3095 is employed as a header compression method for IP/UDP packets. RoHC is a method for achieving compression of header information by separating the header information arranged in an IP header and a UDP header constituting an IP/UDP packet into static information (SC: Static Chain) and dynamic information (DC: Dynamic Chain) and avoiding the static information (SC) to be transmitted repeatedly to reduce the number of transmissions thereof.

Here, static information (SC) is one that, of the header information, the preset contents do not change or the contents are consistently maintained throughout a situation. By contrast, dynamic information (DC) is one that, of the header information, the preset contents change depending on situations or one with flexibility that the contents can be selected depending on situations.

Examples of Static Information (SC) and Dynamic Information (DC)

FIG. 5 is a diagram illustrating examples of the static information (SC) and the dynamic information (DC) in the IP header and the UDP header.

A of FIG. 5 is a diagram illustrating an example of the static information (SC).

The static information (SC) includes 4 bits of Version, 1 byte of Protocol, 4 bytes or 16 bytes of Source IP address, and 4 bytes or 16 bytes of Destination IP address in the IP header.

Version represents whether the IP version is IPv4 (IP version 4) or IPv6 (IP version 6). Protocol represents a protocol included in the payload of an IP packet (IP/UDP packet). In the present embodiment, the payload of an IP packet (IP/UDP packet) includes a UDP packet. Since UDP is represented by 17, 17 is set in the Protocol.

In the Source IP address, the IP address of the transmission source of the IP packet (IP/UDP packet) is set. Further, in the Destination IP address, the IP address of the destination of the IP packet (IP/UDP packet) is set.

Note that in a case where the Source IP address and the Destination IP address are 4 bytes, Version is IPv4 (IP version 4). Further, in a case where the Source IP address and the Destination IP address are 16 bytes, Version is IPv6 (IP version 6).

Further, the static information (SC) includes 2 bytes of Source Port number and 2 bytes of Destination Port number in the UDP header.

In the Source Port number, the port number of the transmission source of the UDP packet is set. Further, in the Destination Port number, the port number of the destination of the UDP packet is set.

B of FIG. 5 is a diagram illustrating an example of the dynamic information (DC).

The dynamic information (DC) includes 1 byte of Type of Service, 1 byte of Time To Live, 2 bytes of Identification, and 1 byte of Flags in the IP header.

The 1-byte Type of Service (TOS) includes 6 bits of DSCP (Differentiated Services Code Point) and 2 bits of ECN (Explicit Congestion Notification). The DSCP represents the priority of the IP packet (IP/UDP packet). The ECN is used for congestion control over the IP packet (IP/UDP packet).

The Time To Live (TTL) represents the lifetime of the IP packet (IP/UDP packet), that is, the number of routers through which the IP packet (IP/UDP packet) can pass, for example. The Identification and Flags are information regarding division of the IP packet (IP/UDP packet).

Further, the dynamic information (DC) includes 2 bytes of Checksum in the UDP header. The Checksum is a checksum used for detecting an error in the UDP packet.

(Overview of RoHC Header Compression)

FIG. 6 is a diagram for describing the overview of the RoHC header compression.

FIG. 6 schematically illustrates the headers and payload of each packet processed when the IP headers and the UDP headers of IP/UDP packets in A of FIG. 6 are subjected to the RoHC header compression and transmitted as RoHC transmission packets in E of FIG. 6.

Note that in FIG. 6, A of FIG. 6 represents the IP/UDP packets while B to D of FIG. 6 individually represent the static information (SC), the dynamic information (DC), and the payloads (Payloads) constituting the IP/UDP packets in A of FIG. 6. Further, E of FIG. 6 represents the RoHC transmission packets (compression packets).

The IP headers and the UDP headers of the IP/UDP packets in A of FIG. 6 include the static information (SC) and the dynamic information (DC). The static information (SC) in B of FIG. 6 is each of an IP/UDP packet having the same IP address and port number and of common header information. Therefore, for example, where the static information (SC) is transmitted by the first packet, the static information (SC) does not need to be transmitted by the subsequent packets.

By contrast, the dynamic information (DC) in C of FIG. 6 is each of an IP/UDP packet having the same IP address and port number and of varying header information. Therefore, for example, where the dynamic information (DC) is transmitted by the first packet, the dynamic information (DC) needs to be transmitted by the subsequent packets as well.

That is, as long as the IP/UDP packets have the same IP address and port number, the static information (SC) only needs to be transmitted once. As the RoHC transmission packets in E of FIG. 6, therefore, the static information (SC) and the dynamic information (DC) are arranged in the header of the first transmission packet (complete transmission packet) and only the dynamic information (DC) is arranged in the headers of the subsequent transmission packets as the information regarding the difference from the header information of the complete transmission packet.

This configuration can eliminate the need for transmitting the static information (SC) in the second and subsequent transmission packets and reduce the number of transmissions of the static information (SC). As a result, the header information of the transmission packets can be compressed. Note that the receiving apparatus 20 can restore the IP/UDP packets (A of FIG. 6 by restoring the header information using the static information (SC) and the dynamic information (DC) included in the RoHC transmission packets (E of FIG. 6).

Here, although it is possible to efficiently transmit the IP/UDP packets by compressing the headers of the IP/UDP packets, it is desirable that the header compression information including the static information (SC) or the dynamic information (DC) is transmitted more efficiently since the header compression information is information that is periodically and repeatedly transmitted.

Accordingly, in the physical layer frame to which the present technology is applied, the header compression information is also mapped to the head of the data portion (payload) to be transmitted immediately after and subsequent to the preamble of the physical layer frame transmitted in a certain period. This enables more efficient transmission of the header compression information.

Figure 7:
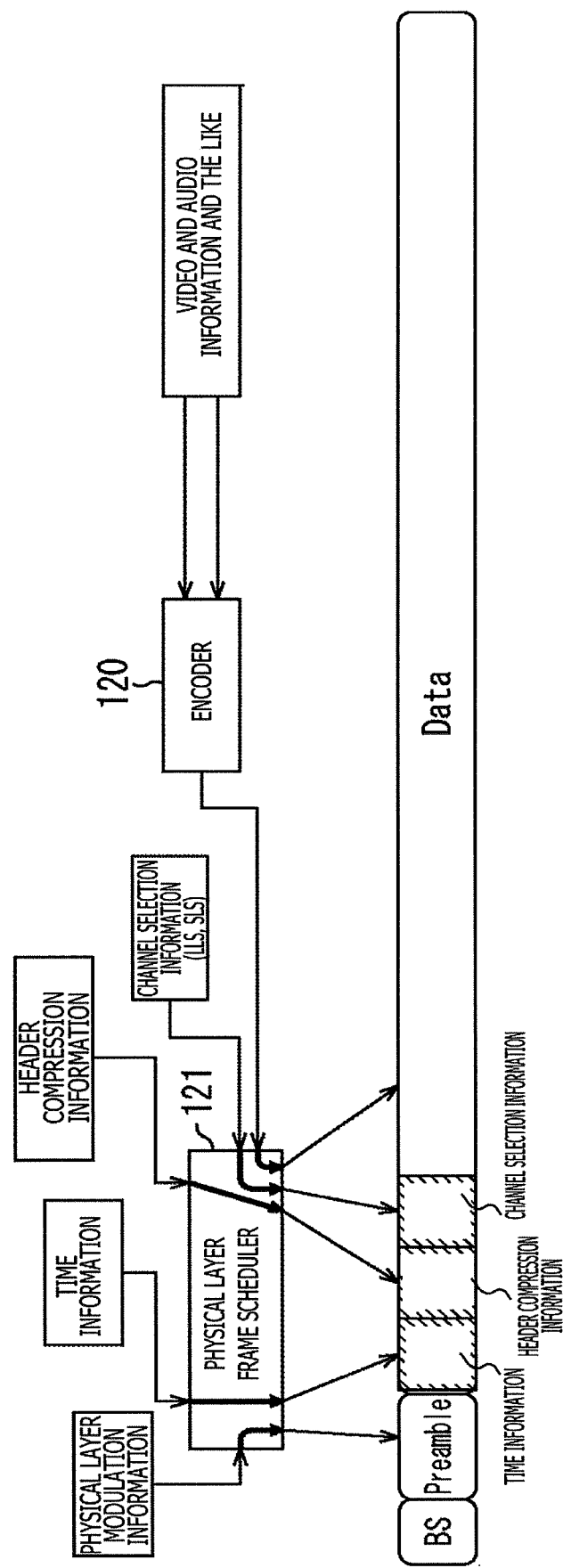
FIG. 7 is a diagram for describing arrangement of header compression information in an optimal position by the physical layer frame scheduler.

Specifically, as illustrated in FIG. 7, the physical layer frame scheduler 121 in the transmitting apparatus 10 manages the header compression information such that the header compression information is arranged at the head of the data portion of the physical layer frame, as in the case of the channel selection information in FIG. 3 or the time information in FIG. 4. By arranging the header compression information immediately after the preamble in the physical layer frame in this way, the receiving apparatus 20 can promptly acquire (extract) the header compression information from the data portion after processing the preamble. This can restore the IP/UDP packet more efficiently.

Note that in a case where the channel selection information, the time information, and the header compression information are transmitted as the periodic transmission information, the time information is required to be of the highest precision. Therefore, it is desirable that the time information is arranged first in the area at the head of the data portion of the physical layer frame. Further, since the header compression information is information necessary for restoring the IP/UDP packet, it is desirable that the header compression information is arranged preferentially over the channel selection information. That is, as illustrated in FIG. 7, it is desirable that the periodic transmission information is arranged in the order of the time information, the header compression information, and the channel selection information in the area at the head of the data portion of the physical layer frame.

Note that although it is desirable that the periodic transmission information is arranged in the order of the time information, the header compression information, and the channel selection information in the area at the head of the data portion of the physical layer frame, the order of the arrangement of these pieces of periodic transmission information may be arbitrary. For example, the header compression information, the time information, and the channel selection information may be arranged in this order. Further, FIG. 6 is one example of the header compression and another header compression method may be employed so as not to transmit the static information (SC), for example, utilizing the fact that an IP address and a port number (hereinafter referred to as a well-known address and port (well known IP address/port number)) for which purpose of use is predetermined are allocated to (an IP/UDP packet that arranges) signaling information.

As described above, the periodic transmission information can be transmitted efficiently by arranging the periodic transmission information such as the channel selection information, the header compression information, and the channel selection information in the area immediately after the preamble of the physical layer frame and at the head of the data portion.

3. Methods of Transmitting Periodic Transmission Information (Methods of Transmitting Periodic Transmission Information)

FIG. 8 is a diagram illustrating exemplary methods of transmitting the periodic transmission information.

As illustrated in FIG. 8, the periodic transmission information can be transmitted using any one of the following five transmission methods (1) to (5), for example.
(1) IP/UDP Packet Transmission Method
(2) L2 Signaling Transmission Method
(3) L2 Extension Header Transmission Method
(4) L1 Extension Header Transmission Method
(5) L1 Signaling Transmission Method The IP/UDP packet transmission method is a method of transmitting the periodic transmission information arranged in the payload of an IP/UDP packet. Further, the L2 signaling transmission method is a method of transmitting the periodic transmission information as L2 signaling information (L2 Signaling) arranged in the payload of an ALP packet.

The L2 extension header transmission method is a method of transmitting the periodic transmission information arranged in the L2 extension header (L2 Extension Header) of an ALP packet. Further, the L1 extension header transmission method is a method of transmitting the periodic transmission information arranged in the L1 extension header (L1 Extension Header) of a BB packet.

The L1 signaling transmission method is a method of transmitting the periodic transmission information as L1 signaling information (L1 Signaling) arranged in the bootstrap or the preamble of a physical layer frame.

Note that in the case of the L1 signaling transmission method, the periodic transmission information is not arranged at the head of the data portion of the physical layer frame, but arranged in the bootstrap or the preamble processed before the data portion in the physical layer frame. As a result, the periodic transmission information can be extracted before other information arranged in the data portion. The details of the L1 signaling transmission method will be described later with reference to FIG. 22.

(System Pipe Model)

Figure 9:
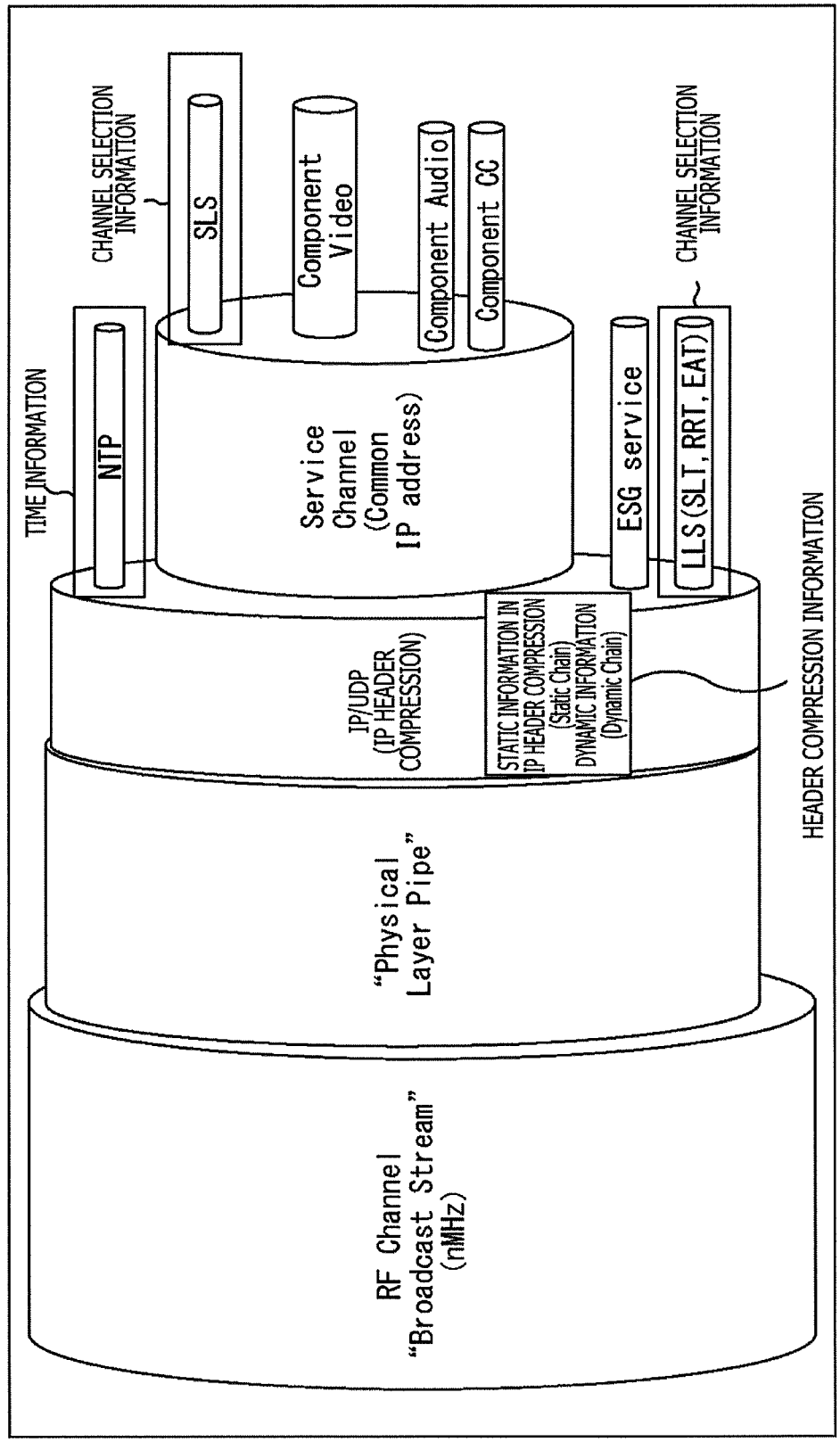
FIG. 9 is a diagram illustrating an exemplary system pipe model of an IP transmission method.

FIG. 9 is a diagram illustrating an exemplary system pipe model of the IP transmission method.

In FIG. 9, a broadcast stream (Broadcast Stream) in a predetermined frequency band (for example, 6 MHz) includes a PLP (Physical Layer Pipe). Note that although the example in FIG. 9 illustrates an example where one PLP is included in the broadcast stream, a maximum of 64 PLPs can be included for each predetermined frequency band in ATSC 3.0, for example.

A PLP includes data such as components (Video, Audio, CC (Closed Captioning)), signaling information (LLS, SLS), time information (NTP), and electronic service guide (ESG: Electronic Service Guide) arranged in an IP/UDP packet. Note that the header information arranged in the IP header and UDP header of this IP/UDP packet is compressed.

Here, it is expected in ATSC 3.0 that LLS (Link Layer Signaling) signaling information and SLS (Service Layer Signaling) signaling information are used as upper layer signaling information. The LLS signaling information is signaling information acquired ahead of the SLS signaling information, while the SLS signaling information is acquired according to the information included in the LLS signaling information.

This LLS signaling information includes metadata such as, for example, an SLT (Service List Table), an EAT (Emergency Alerting Table), and an RRT (Region Rating Table).

The SLT metadata includes information indicating the configuration of streams and services in the broadcast network, such as information (channel selection information) necessary for selection of a service. The EAT metadata includes information regarding emergency information. The emergency information is information that needs urgent notification. The RRT metadata includes information regarding ratings of a program such as viewable age.

Further, metadata such as, for example, USBD (User Service Bundle Description) or USD (User Service Description), S-TSID (Service-based Transport Session Instance Description), and MPD (Media Presentation Description) are included as the SLS signaling information for each service.

The USBD or USD metadata includes information such as the acquisition destination of other metadata. The S-TSID metadata is an extended LSID (LCT Session Instance Description) for ATSC 3.0 and is control information for the ROUTE (Real-Time Object Delivery over Unidirectional Transport) protocol. The MPD metadata is control information for managing reproduction of a component stream.

Note that ROUTE is a protocol that extends the FLUTE (File Delivery over Unidirectional Transport). FLUTE is a protocol suitable for multicast transfer of binary files in one direction. Video and audio components, signaling information, and the like can be transmitted using this ROUTE session.

Note that the channel selection information may be included in the SLS signaling information. Further, metadata such as USBD, USD, S-TSID, and MPD are described in a markup language such as XML (Extensible Markup Language). Further, the MPD metadata conforms to the MPEG-DASH (Dynamic Adaptive Streaming over HTTP) standard.

The time information such as NTP is information for synchronizing the transmitting apparatus 10 on the transmitting side and the receiving apparatus 20 on the receiving side. Note that although the example in FIG. 9 illustrates NTP as an example, other time information such as PTP may be used, for example.

The header compression information includes the static information (SC) or the dynamic information (DC). Here, for example, the static information (SC) and the dynamic information (DC) are transmitted in the first IP/UDP packet and only the dynamic information (DC) is transmitted in the subsequent IP/UDP packets. This can reduce the number of transmissions of the static information (SC), compressing the header information of the IP/UDP packets as a result.

Note that the example of the system pipe model in FIG. 9 illustrates the case where the periodic transmission information such as the channel selection information and the time information is arranged in an IP/UDP packet, that is, the case where the IP/UDP packet transmission method is used to facilitate the understanding of the description. Further, although FIG. 9 illustrates the case where the LLS signaling information is transmitted by the IP/UDP packet, the LLS signaling information may be arranged in the payload of an ALP packet and transmitted as the L2 signaling information.

(Data Structure of Each Layer)

Figure 10:
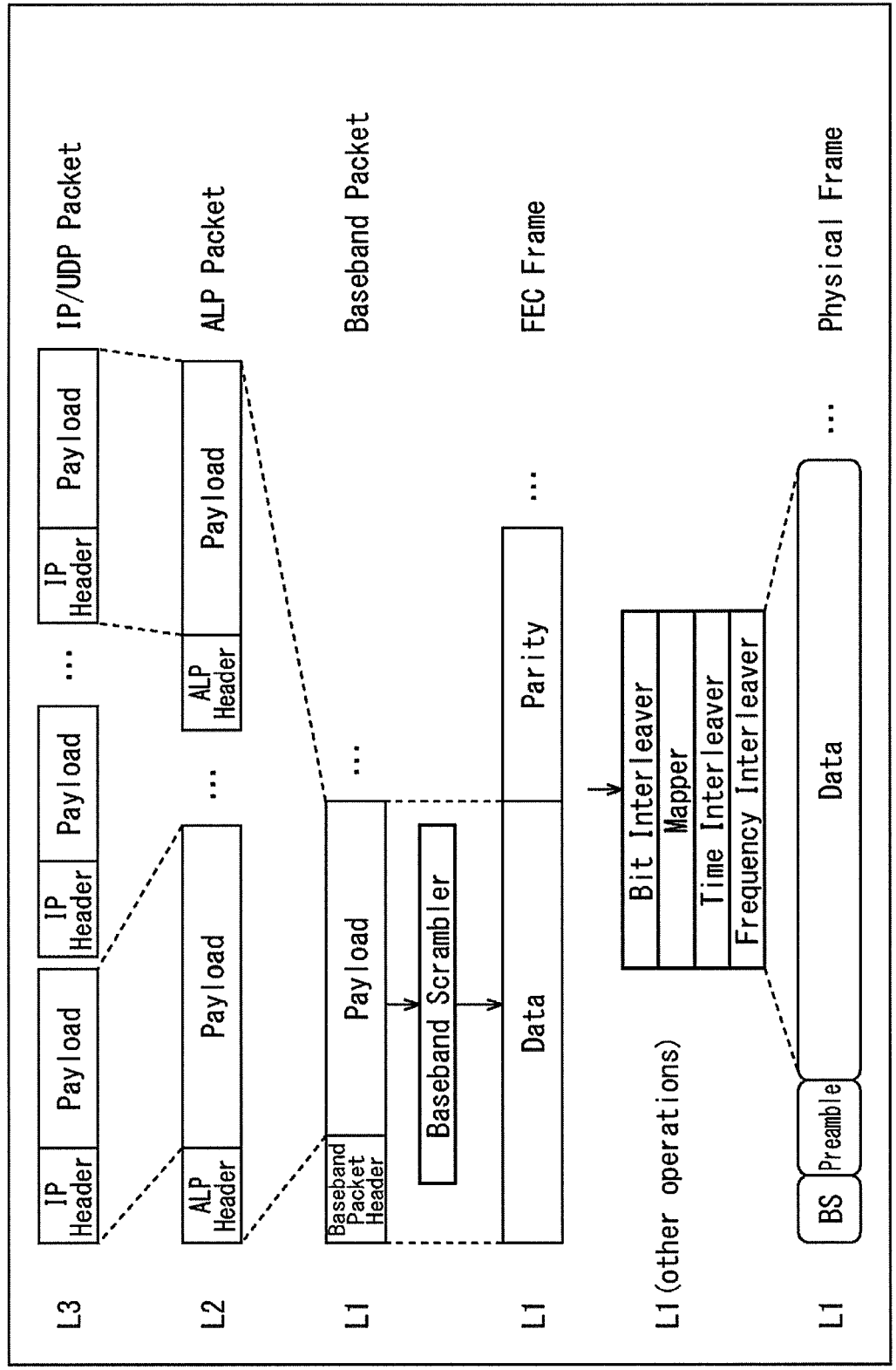
FIG. 10 is a diagram illustrating data structure of each layer of the IP transmission method.

FIG. 10 is a diagram illustrating the data structure of each layer of the IP transmission method.

The protocol stack of the digital broadcasting of the IP transmission method such as ATSC 3.0 has a hierarchical structure including a layer 1 (L1) as a physical layer, a layer 2 (L2) as an upper layer of the layer 1, and a layer 3 (L3) as an upper layer of the layer 2.

In the layer 3, IP/UDP packets are transmitted. An IP/UDP packet includes an IP header (IP Header) and a payload (Payload). Video and audio data, signaling information, and the like are arranged in the payload of the IP/UDP packet. Note that where the IP/UDP packet transmission method is used, the periodic transmission information such as the channel selection information and the time information is arranged in the payload of the IP/UDP packet.

In the layer 2, ALP (ATSC Link-layer Protocol) packets as transmission packets are transmitted. An ALP packet includes an ALP header (ALP Header) and a payload (Payload). In the payload of the ALP packet, one or a plurality of IP/UDP packets is arranged and encapsulated (encapsulation). Note that where the L2 signaling transmission method is used, the periodic transmission information such as the channel selection information and the time information is arranged in the payload of the ALP packet. Further, where the L2 extension header transmission method is used, the periodic transmission information such as the channel selection information and the time information is arranged in the extension header of the ALP header of the ALP packet.

A BB packet (Baseband Packet) in the layer 1 includes a BB header (Baseband Packet Header) and a payload (Payload). In the payload of the BB packet, one or a plurality of ALP packets is arranged and encapsulated. Note that where the L1 extension header transmission method is used, the periodic transmission information such as the channel selection information and the time information is arranged in the extension header of the BB header of the BB packet.

In the layer 1, moreover, data (Data) acquired by scrambling a plurality of BB packets is mapped to an FEC frame (FEC Frame), and a parity (Parity) for error correction in the physical layer is added.

Here, the physical layer frame (Physical Frame) in the layer 1 includes a bootstrap (BS: Bootstrap), a preamble (Preamble), and a data portion (Data). Then, a mapping process is performed on the data portion of the physical layer frame after bit-interleaving is performed on a plurality of FEC frames, and then data acquired by performing the physical layer process such as interleaving in the time direction and the frequency direction is mapped.

Note that where the L1 signaling transmission method is used, the periodic transmission information such as the channel selection information and the time information is arranged in the bootstrap or the preamble of the physical layer frame. Note that the bootstrap includes a bootstrap symbol corresponding to the number of PLPs to be used, and the periodic transmission information such as the channel selection information and the time information can be arranged in this bootstrap symbol, for example.

(Transmission of Periodic Transmission Information in Each PLP)

Figure 11:
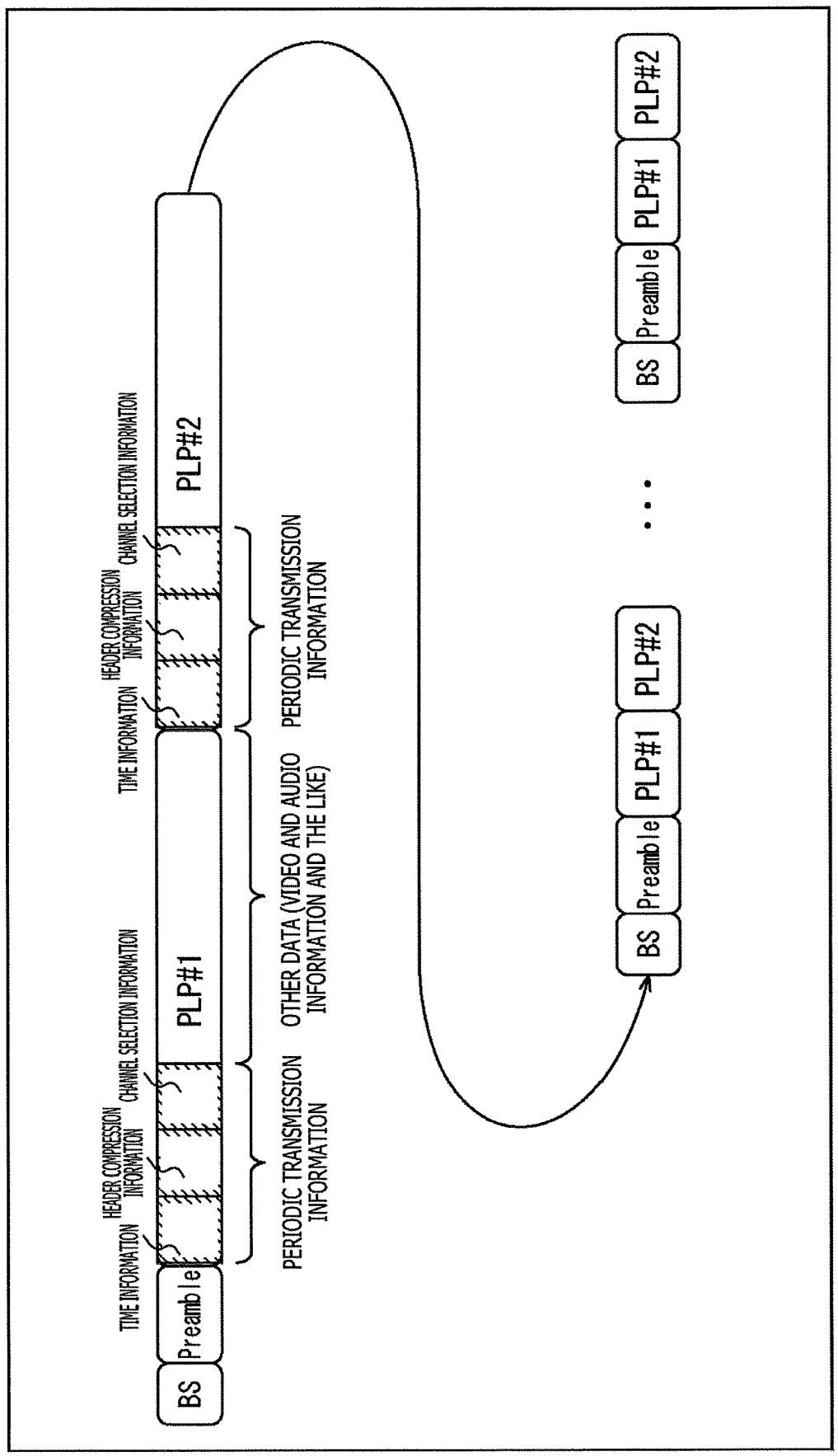
FIG. 11 is a diagram illustrating an exemplary arrangement of the periodic transmission information in each PLP.

FIG. 11 is a diagram illustrating an exemplary arrangement of the periodic transmission information in each PLP.

A plurality of PLPs can be included in a broadcast stream in a predetermined frequency band (for example, 6 MHz). For example, in ATSC 3.0, a maximum of 64 PLPs can be included for each predetermined frequency band. Then, data included in these PLPs are arranged in the data portion (payload) of the physical layer frame, but the periodic transmission information such as the channel selection information, the time information, or the header compression information is basically different from PLP to PLP.

Accordingly, where a plurality of PLPs is included in the physical layer frame, the physical layer frame scheduler 121 arranges the periodic transmission information included in each PLP at the head of each PLP.

Specifically, where the data of PLP #1, PLP #2, are sequentially arranged in the data portion of the physical layer frame in FIG. 11, the periodic transmission information of PLP #1 is arranged at the head of the data of PLP #1 and the periodic transmission information of PLP #2 is arranged at the head of the data in PLP #2. Further, although not illustrated, this is also similar in PLP #3 and subsequent PLPs where the data of PLP #3 and subsequent PLPs are arranged. That is, the periodic transmission information of each PLP is arranged at the head of the data of the corresponding PLP.

In this way, where a plurality of PLPs is included in the physical layer frame, the periodic transmission information corresponding to each PLP is arranged at the head of the data of the corresponding PLP, so that the periodic transmission information such as the time information, the header compression information, or the channel selection information to be periodically transmitted can be efficiently transmitted.

(1) IP/UDP Packet Transmission Method

Figure 12:
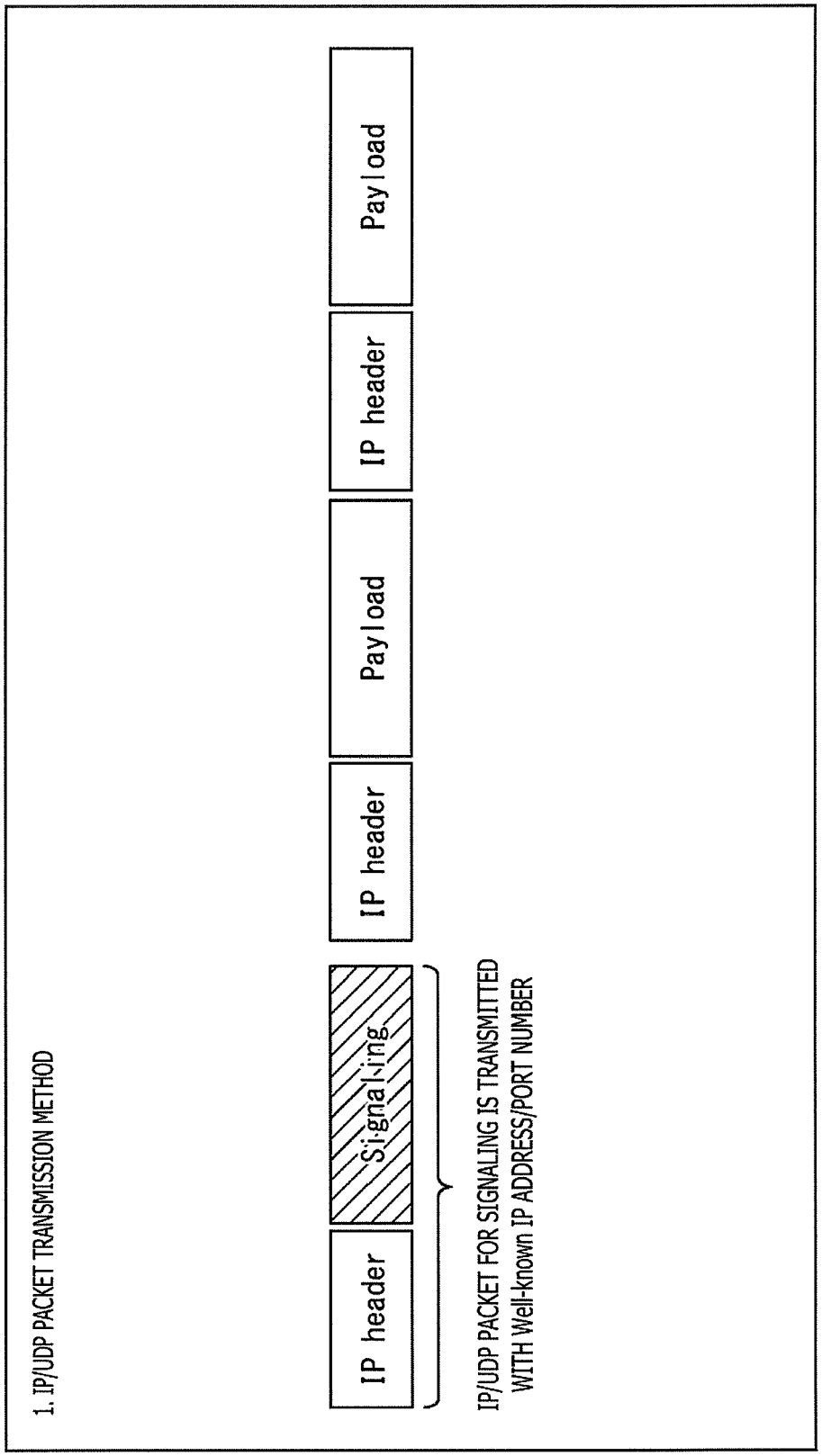
FIG. 12 is a diagram for describing transmission of the periodic transmission information using an IP/UDP packet transmission method.

FIG. 12 is a diagram for describing the transmission of the periodic transmission information using the IP/UDP packet transmission method.

In this IP/UDP packet transmission method, an IP/UDP packet in which periodic transmission information is arranged in the payload of the first ALP packet is arranged in the first BB packet included in the data portion (payload) of the physical layer frame.

In FIG. 12, signaling information (for example, LLS signaling information) including the periodic transmission information such as the channel selection information and the time information is arranged in the payload of the first IP/UDP packet. Further, in the subsequent IP/UDP packets, video and audio data and the like as components are arranged in the respective payloads.

Note that well-known address and port (IP address and port number) whose purpose of use is predetermined are allocated to the IP/UDP packet in which the signaling information is arranged. Therefore, the receiving apparatus 20 can acquire the signaling information by monitoring the IP/UDP packet having the specific IP address and port number.

Figure 13:
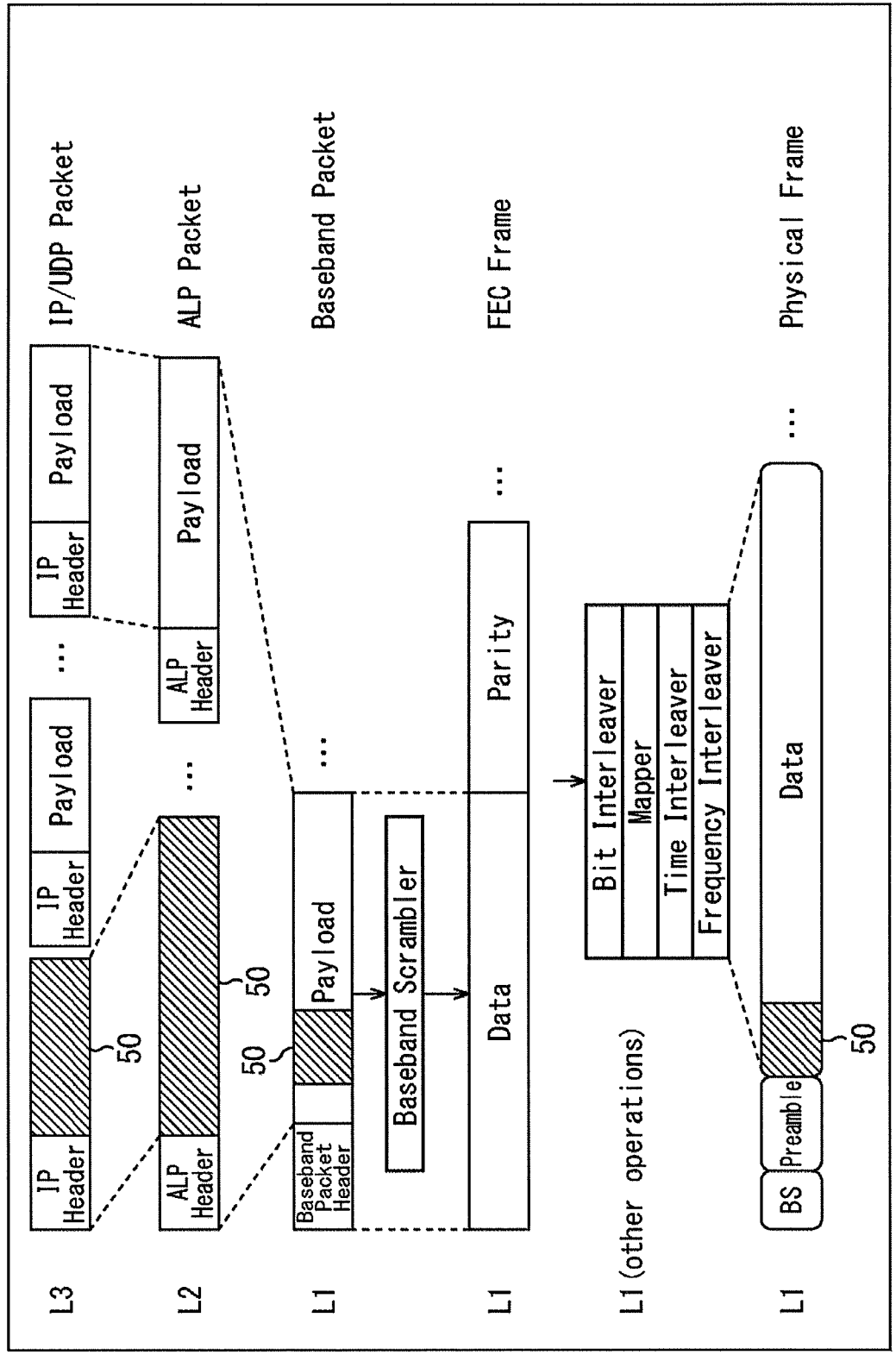
FIG. 13 is a diagram illustrating data structure of each layer at the time of transmission of the periodic transmission information.

FIG. 13 is a diagram illustrating the data structure of each layer at the time of transmission of the periodic transmission information using the IP/UDP packet transmission method.

In FIG. 13, paying attention to the layer 3 IP/UDP packet, periodic transmission information 50 such as channel selection information and time information is arranged in the payload in the first IP/UDP packet, and components such as video and audio or data such as an electronic service guide (data other than the periodic transmission information) are arranged in the subsequent IP/UDP packets. Further, data other than the periodic transmission information are also arranged in the subsequent IP/UDP packets. Then, these IP/UDP packets are arranged in ALP packets in the layer 2.

In the layer 1, one or a plurality of ALP packets is arranged and encapsulated in the payload of a BB packet. Further, in the layer 1, data acquired by scrambling a plurality of BB packets is mapped to an FEC frame, and a parity is added. Then, a mapping process is performed after bit-interleaving is performed on a plurality of FEC frames, and then data acquired by performing a physical layer process such as interleaving in the time direction and the frequency direction is mapped to the data portion of a physical layer frame in the layer 1.

At this time, the physical layer frame scheduler 121 processes the periodic transmission information 50 including the channel selection information, the time information, and the like such that the periodic transmission information 50 is arranged at the head of the data portion (payload) of the physical layer frame, and the periodic transmission information 50 is arranged immediately after the preamble and at the head of the data portion in the physical layer frame in the layer 1.

As described above, the periodic transmission information can be arranged and transmitted at the head of the data portion (immediately after the preamble) of the physical layer frame by arranging the IP/UDP packet including the periodic transmission information in the payload of the first ALS packet in the first BB packet of the physical layer frame using the IP/UDP packet transmission method as a transmission format for transmitting the periodic transmission information. That is, in the physical layer frame, the periodic transmission information can be arranged in an area that is extractable temporally before other information arranged in the data portion.

Note that where the IP/UDP packet transmission method is used, there is a case where the restoration of the IP/UDP packet is not possible when the header compression information regarding the IP header and UDP header is arranged in the payload of the IP/UDP packet. In this case, the header compression information just needs to be excluded from the periodic transmission information arranged in the payload of the IP/UDP packet.

(2) L2 Signaling Transmission Method

Figure 14:
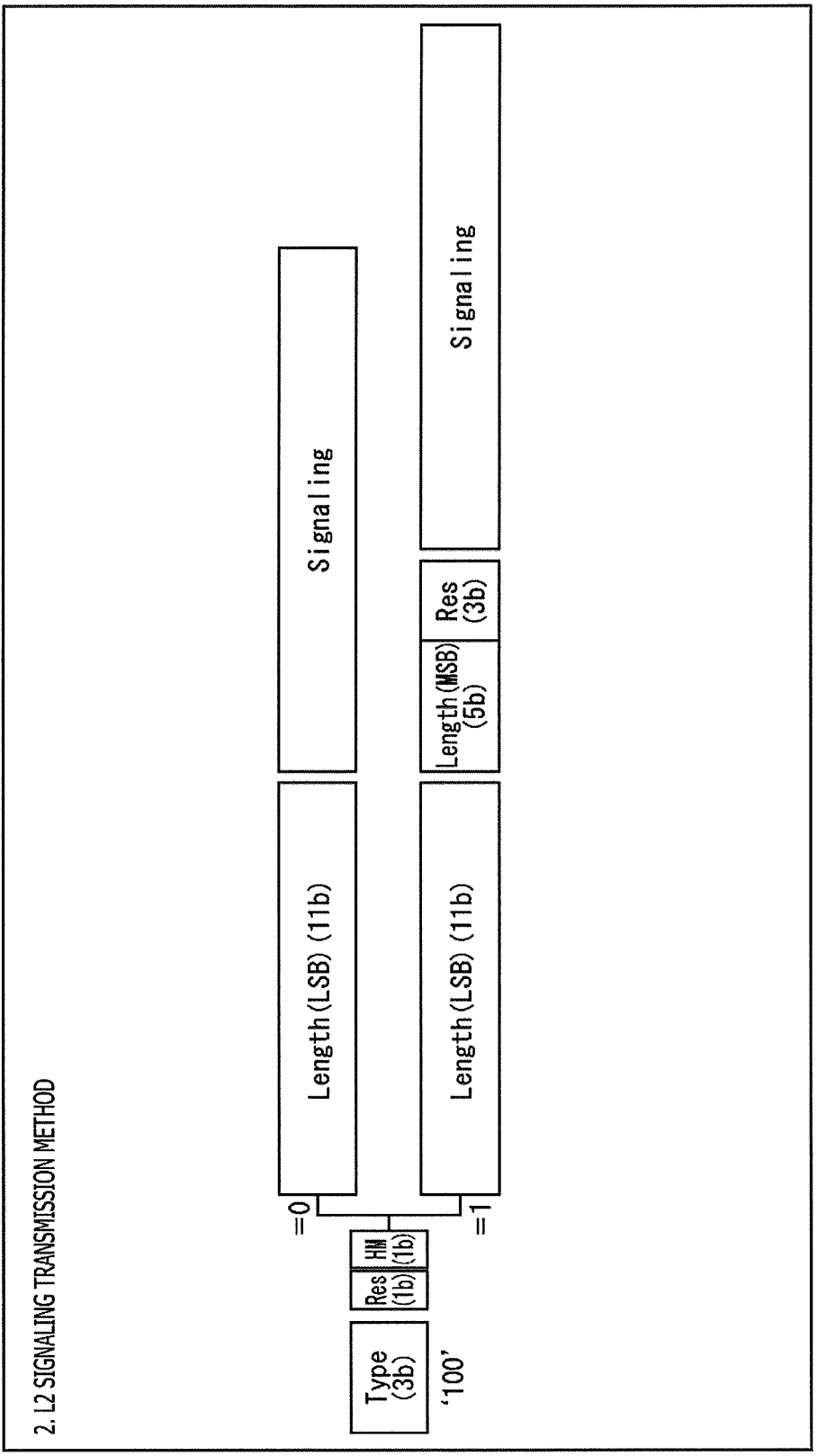
FIG. 14 is a diagram for describing the transmission of the periodic transmission information using an L2 signaling transmission method.

FIG. 14 is a diagram for describing the transmission of the periodic transmission information using the L2 signaling transmission method.

In this L2 signaling transmission method, the periodic transmission information is arranged as L2 signaling information in the payload of the first ALP packet in the first BB packet included in the data portion (payload) of the physical layer frame.

FIG. 14 illustrates the configuration of the ALP packet. In the ALP packet in FIG. 14, 3-bit type information (Type) is set at the head of the ALP header. In this type information, as illustrated in FIG. 15, information regarding the type of data arranged in the payload of the ALP packet is set.

That is, where an IPv4 IP packet (IP/UDP packet) is arranged in the payload, the type information is set to "000." Further, where a compressed IP packet (IP/UDP packet) is arranged in the payload, the type information is set to "001." Moreover, where a TS packet of the MPEG2-TS method is arranged in the payload, the type information is set to "010."

Further, where the L2 signaling information is arranged in the payload, the type information is set to "100." Note that in FIG. 15, the pieces of type information "011," "101," and "110" are undefined (Reserved). Further, where the extension with the three undefined (Reserved) areas is insufficient, "111" is set to extend the type information including a predetermined area.

Returning back to the description of FIG. 14, since the L2 signaling information is arranged in the payload in the L2 signaling transmission method, the type information of the ALP header is set to "100." Further, in the ALP header, following the type information in which "100" is set, a 1-bit reserved area (Res: Reserved) is set, after which a header mode (HM: Header Mode) is arranged.

Where "0" is set as the header mode, 11-bit length information (Length (LSB)) is arranged subsequently. This length information is set to the length of the payload of the ALP packet. On the other hand, where "1" is set as the header mode, length information of 16 bits in total including 11-bit length information (Length (LSB)) and 5-bit length information (Length (MSB)) is arranged subsequently, after which a 3-bit reserved area (Res) is provided.

That is, where "0" is set as the header mode, the length information (Length (LSB)) is 11 bits. Therefore, a value within a range between 0 and 2047 (=211-1) bytes can be represented as the length of the payload of the ALP packet. However, the 11-bit length information cannot represent payload length that is 2048 bytes or longer. Therefore, where data having 2048 bytes or longer is arranged in the payload, "1" is set as the header mode and 1 byte is added as an area of the ALP header, whereby the 2048 bytes or longer length payload can be represented.

In the ALP packet, the payload is arranged following the ALP header configured as described above. Here, since "100" is set as the type information of the ALP header, the L2 signaling information is arranged in the payload. Then, in the L2 signaling transmission method, the periodic transmission information is arranged as this L2 signaling information. Note that as described above, the ALP packet in which the L2 signaling information including this periodic transmission information is arranged in the payload corresponds to the first ALP packet in the first BB packet of the physical layer frame.

Figure 16:
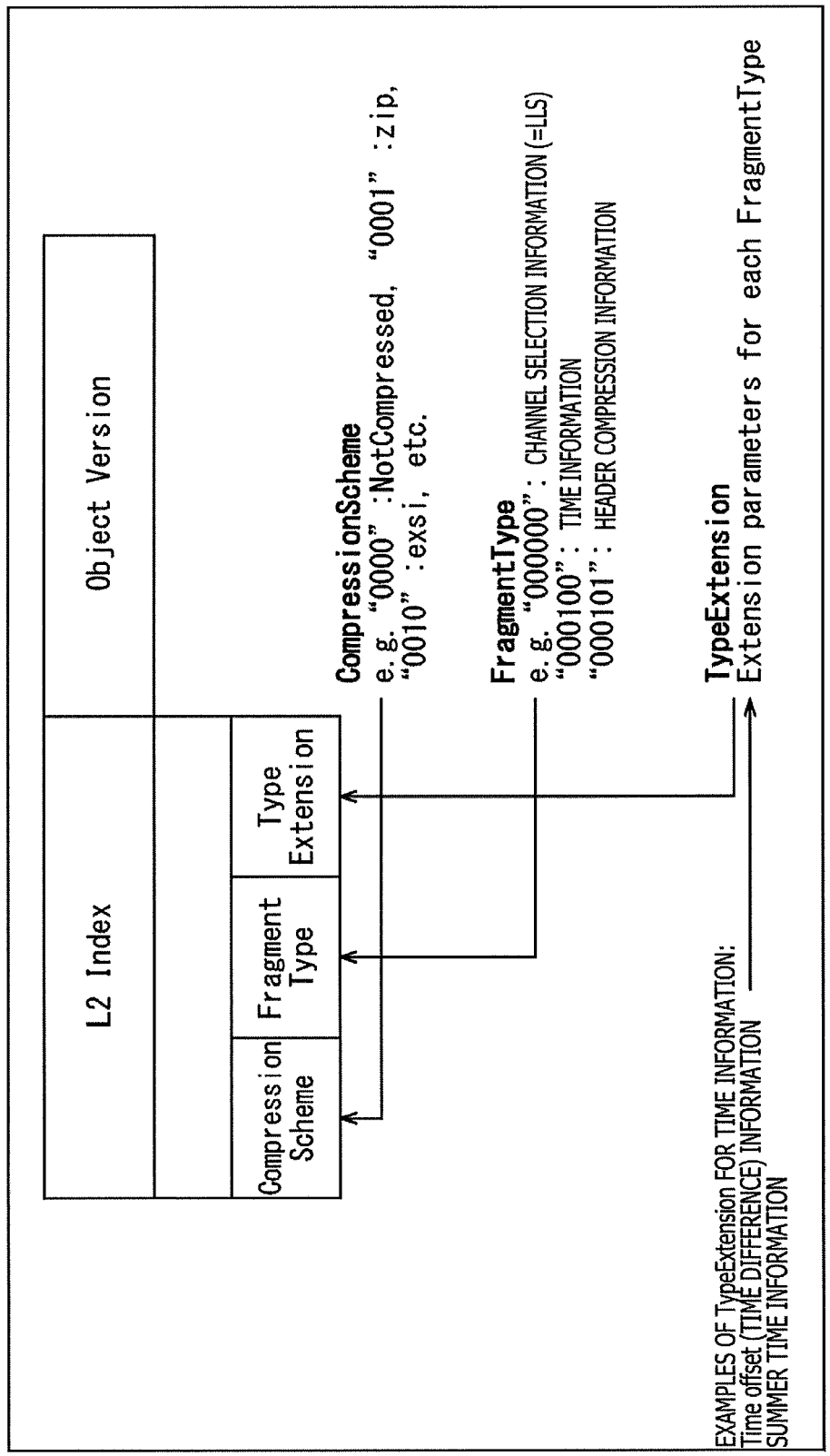
FIG. 16 is a diagram for describing an L2 header.

Here, description will be made with regard to the L2 header added to the L2 signaling information (periodic transmission information) arranged in the payload of the ALP packet with reference to FIG. 16. As illustrated in FIG. 16, a structure including L2 index information (L2 Index) and object version information (Object Version) can be arranged in the L2 header. Note that the receiving apparatus 20 can extract a desired packet by performing a filtering process using information included in this L2 header.

Compression information (Compression Scheme), type information (Fragment Type), and extension type information (Type Extension) are arranged in the L2 index information. In the compression information, information indicating whether target L2 signaling information (periodic transmission information) is compressed is set. For example, where "0000" is set as the compression information, "0000" indicates uncompressed, while where "0001" is set, "0001" indicates compressed in the zip format.

In the type information (Fragment Type), information regarding the type of the target L2 signaling information (periodic transmission information) is set. For example, "000000" can be set as the channel selection information. For example, the channel selection information is included in the LLS signaling information. In this case, where "000000" is set as the type information, this means that the LLS signaling information is arranged in the payload of the ALP packet. Further, "000100" can be set as the time information, while "000101" can be set as the header compression information.

In the extension type information, an extension parameter for each type is set. As the extension type information, for example, where "000100" is set as the type information, time difference information (Offset) on the time information or summer time information regarding daylight-saving time can be set. Further, information regarding the version of an object is arranged in the object version information.

As described above, the periodic transmission information can be arranged and transmitted at the head of the data portion (immediately after the preamble) of the physical layer frame by arranging the L2 signaling information including the periodic transmission information in the payload of the first ALS packet in the first BB packet of the physical layer frame using the L2 signaling transmission method as a transmission format for transmitting the periodic transmission information. That is, in the physical layer frame, the periodic transmission information can be arranged in an area that is extractable temporally before other information arranged in the data portion.

(3) L2 Extension Header Transmission Method

Figure 17:
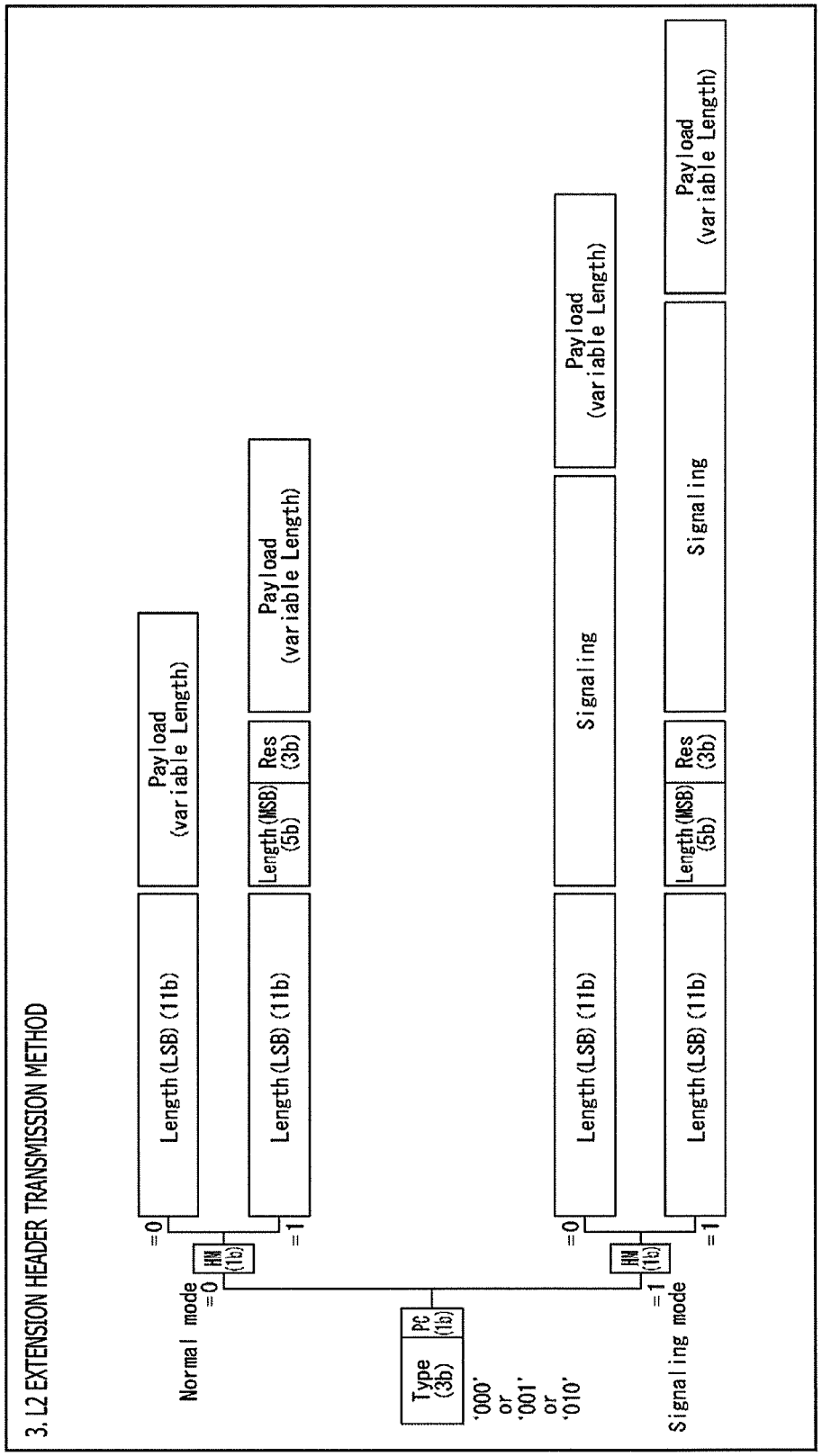
FIG. 17 is a diagram for describing transmission of the periodic transmission information using an L2 extension header transmission method.

FIG. 17 is a diagram for describing the transmission of the periodic transmission information using the L2 extension header transmission method.

In this L2 extension header transmission method, the periodic transmission information is arranged in the extension header of the first ALP packet in the first BB packet of the physical layer frame.

FIG. 17 illustrates the configuration of the ALP packet. In the ALP header in FIG. 17, "000," "001," or "010" is set in the 3-bit type information. That is, as illustrated in FIG. 18, where "000" is set as the type information, an IPv4 IP packet (IP/UDP packet) is arranged in the payload, while where "001" is set, a compressed IP packet (IP/UDP packet) is arranged in the payload. Further, where "010" is set as the type information, a TS packet is arranged in the payload.

Note that although description will be made assuming that "000," "001," or "010" is set as the type information in the L2 extension header transmission method here, the L2 signaling information may be arranged in the payload with "100" set as the type information.

In the ALP header, 1-bit packet setting information (PC: Packet Configuration) is arranged following the type information in which "000," "001," or "010" is set. Where "0" is set as the packet setting information, the ALP header is set to the normal mode (Normal mode) and the length information (Length) is arranged according to the header mode (HM) arranged subsequently. Then, in the payload following the ALP header, an IPv4 IP packet (IP/UDP packet), a compressed IP packet (IP/UDP packet), or a TS packet is arranged according to the type information of the ALP header.

On the other hand, where "1" is set as the packet setting information (PC), the ALP header is set to the signaling mode (Signaling mode) and the length information (Length) is arranged according to the header mode (HM) arranged subsequently. That is, where "0" is set as the header mode, 11-bit length information (Length (LSB)) is arranged subsequently. Further, where the signaling mode is set, the ALP header is extended and the L2 signaling information (Signaling) is arranged following the length information.

Then, in the L2 extension header transmission method, the periodic transmission information is arranged as the L2 signaling information arranged in this extension header (L2 extension header). Note that the payload is arranged following the ALP header (L2 extension header) configured as described above. In this payload, IPv4, a compressed IP packet (IP/UDP packet), or the like is arranged in this payload according to the type information of the ALP header. Note that as described above, the ALP packet in which the L2 signaling information including this periodic transmission information is arranged in the extension header (L2 extension header) of the ALP packet corresponds to the first ALP packet in the first BB packet of the physical layer frame.

Further, where "1" is set as the packet setting information (PC) and "1" is set as the header mode (HM), 16-bit length information (Length) and a 3-bit reserved area (Res) are arranged following the header mode. Further, where the signaling mode is set, the ALP header is extended and the L2 signaling information (Signaling) is arranged following the reserved area (Res). Then, as in the case where the above-described header mode "0" is set, the periodic transmission information is arranged as the L2 signaling information arranged in this extension header (L2 extension header).

Note that in the ALP packet, an IPv4, a compressed IP packet (IP/UDP packet), or the like is arranged in the payload following the extension header (L2 extension header) in which the L2 signaling information including this periodic transmission information is arranged, and this ALP packet corresponds to the first ALP packet in the first BB packet of the physical layer frame as described above.

As described above, the periodic transmission information can be arranged and transmitted at the head of the data portion (immediately after the preamble) of the physical layer frame by arranging the periodic transmission information in the extension header (L2 extension header) of the first ALP packet in the first BB packet of the physical layer frame using the L2 extension header transmission method as a transmission format for transmitting the periodic transmission information. That is, in the physical layer frame, the periodic transmission information can be arranged in an area that is extractable temporally before other information arranged in the data portion.

(4) L1 Extension Header Transmission Method

Figure 19:
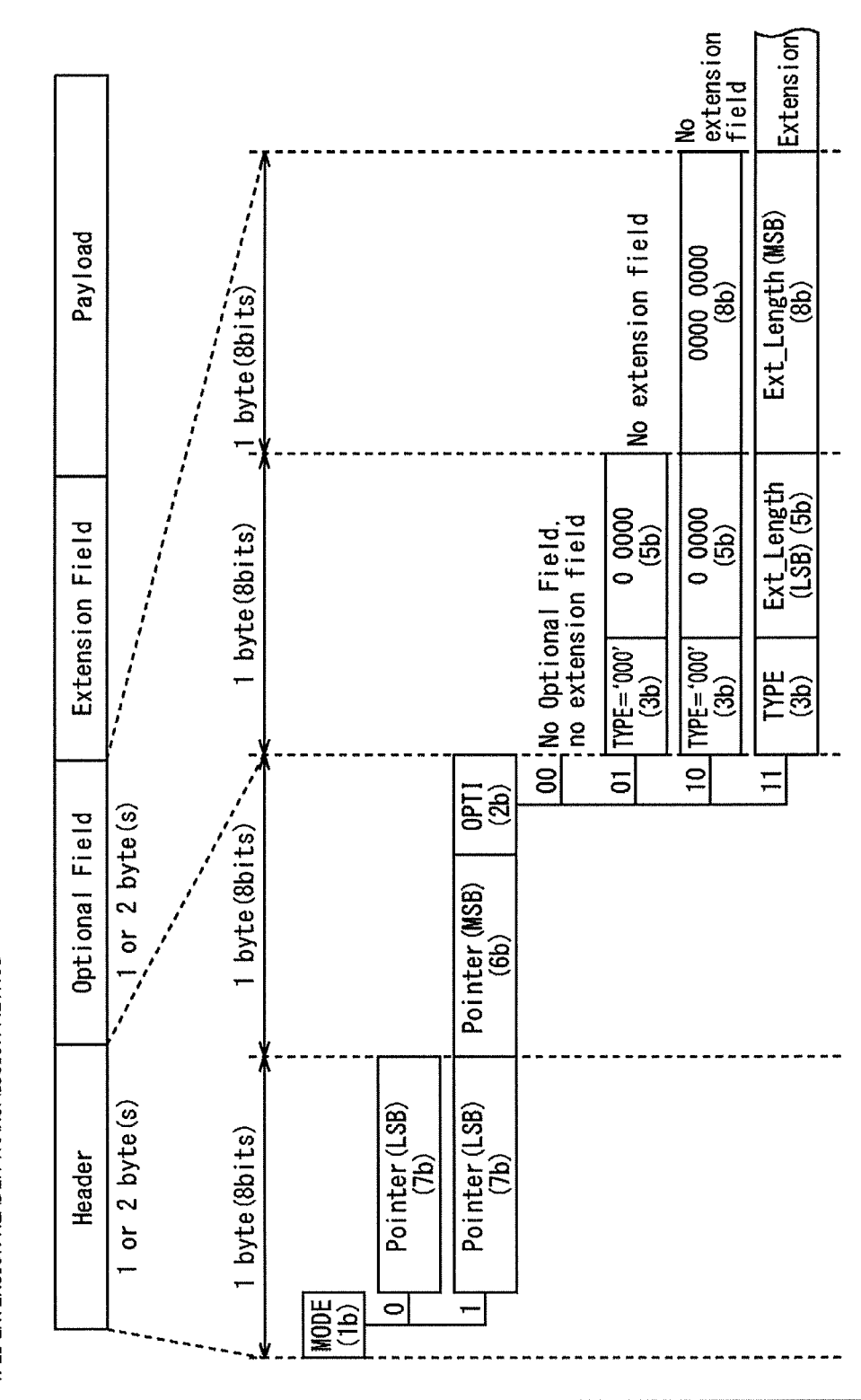
FIG. 19 is a diagram for describing transmission of the periodic transmission information using an L1 extension header transmission method.

FIG. 19 is a diagram for describing the transmission of the periodic transmission information using the L1 extension header transmission method.

In this L1 extension header transmission method, the periodic transmission information is arranged in the extension header of the first BB packet of the physical layer frame.

FIG. 19 illustrates the configuration of the BB packet. In FIG. 19, the BB packet includes a BB packet header and a payload (Payload). In addition to a 1-byte or 2-byte header (Header), an optional field (Optional Field) and an extension field (Extension Field) can be arranged in the BB packet header.

That is, where "0" is set as a 1-bit mode (MODE) in the header (Header), 7-bit pointer information (Pointer (LSB)) is arranged. Note that the pointer information is information for indicating the position of the ALP packet arranged in the payload of the BB packet. For example, where the data of the ALP packet most recently arranged in a certain BB packet is arranged extending over the next BB packet, the position information of the ALP packet arranged at the head of the next BB packet can be set as the pointer information.

Further, where "1" is set as the mode (MODE), 7-bit pointer information (Pointer (LSB)), 6-bit pointer information (Pointer (MSB)), and a 2-bit optional flag (OPTI: OPTIONAL) are arranged. The optional flag is information indicating whether to extend the header by arranging the optional field (Optional Field) and the extension field (Extension Field).

Figure 20:
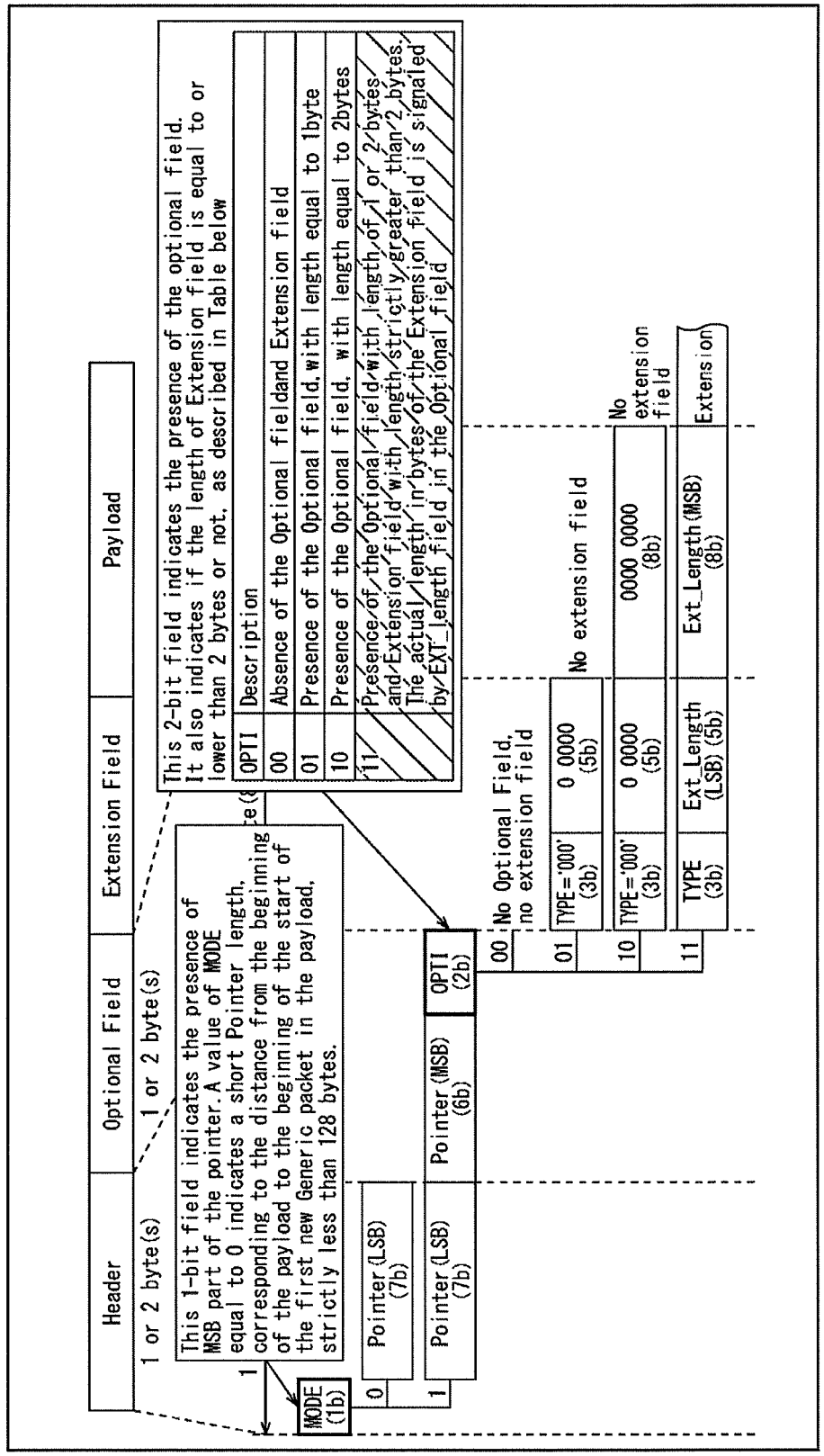
FIG. 20 is a diagram for describing detailed configuration of an extension header in the L1 extension header transmission method.

That is, as illustrated in FIG. 20, where extension is not performed for the optional field and the extension field, the optional flag is set to "00." Further, where only extension is performed for the optional field, the optional flag is set to "01" or "10." Note that where "01" is set as the optional flag, the optional field is padded with 1 byte (8 bits). Further, where "10" is set as the optional flag, the optional field is padded with 2 bytes (16 bits).

Figure 21:
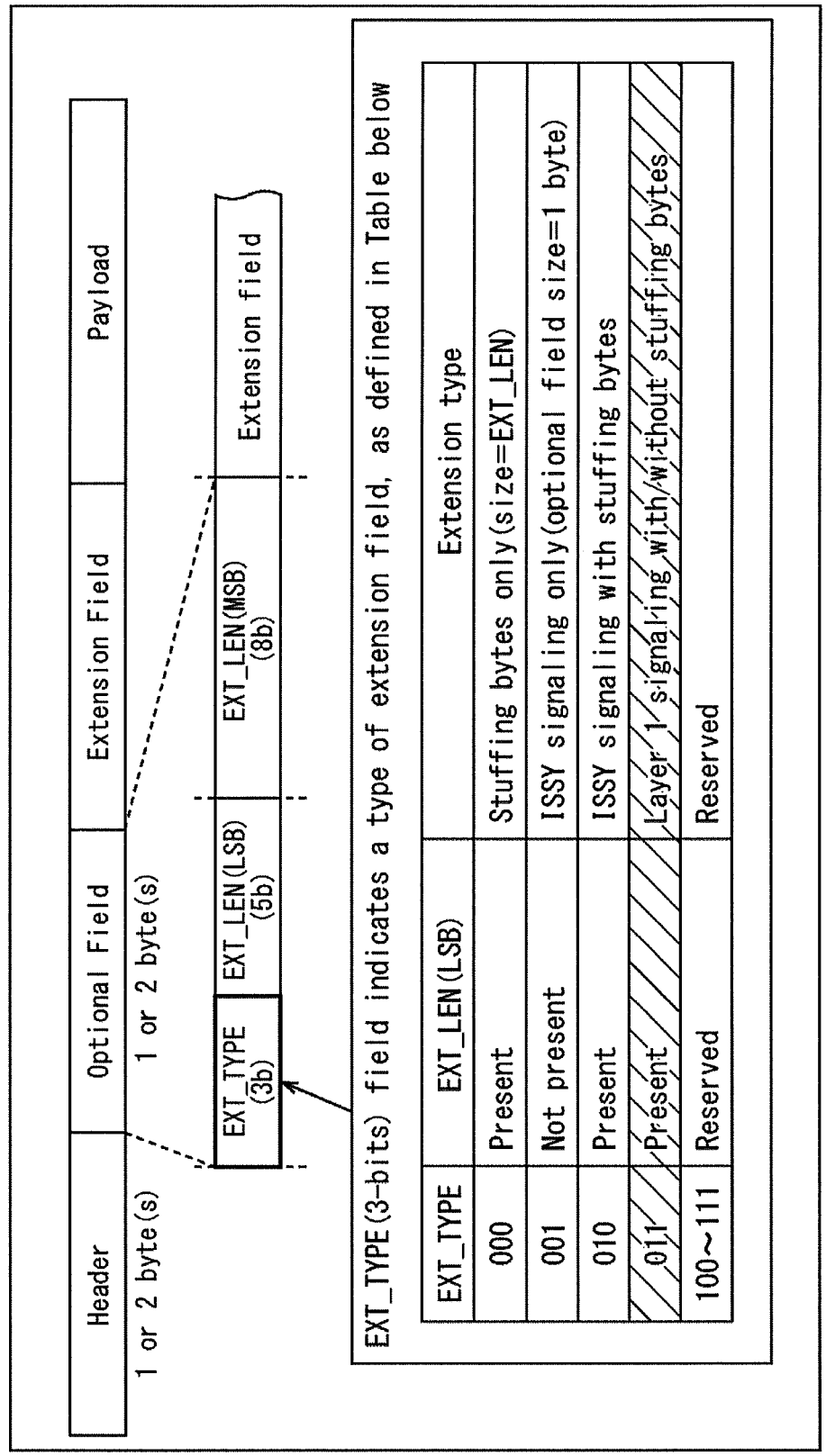
FIG. 21 is a diagram for describing detailed configuration of the extension header in the L1 extension header transmission method.

Further, where extension is performed for the optional field and the extension field, the optional flag is set to "11." In this case, 3-bit extension type information (TYPE (EXT_TYPE)) is set at the head of the optional field. As illustrated in FIG. 21, information regarding the extension length information (EXT_Length (LSB)) arranged following the extension type information and information regarding the extension field type (Extension type) are set in this type information.

That is, where the extension length information is arranged and only the stuffing bytes (Stuffing Bytes) are arranged, the extension type information is set to "000." Further, where an ISSY (Input Stream Synchronizer) is arranged in the extension field without arranging the extension length information, the extension type information is set to "001." Moreover, where the extension length information is arranged and the stuffing bytes are arranged together with the ISSY in the extension field, the extension type information is set to "010."

Further, where the extension length information is arranged and the L1 signaling information is arranged in the extension field, the extension type information is set to "011." In this case, whether the stuffing bytes are arranged is optional. Note that in FIG. 21, the extension type information "100" to "111" is undefined (Reserved).

Then, in the L1 extension header transmission method, the periodic transmission information is arranged as the L1 signaling information in this extension field (L1 extension header). That is, where the L1 extension header transmission method is used, "11" is set as the optional flag (OPTI) to perform extension for the optional field and the extension field, and "011" is further set as the extension type information (EXT_TYPE) of the optional field. Then, the periodic transmission information as the L1 signaling information is arranged in the extension field. Note that as described above, the BB packet in which the L1 signaling information (periodic transmission information) is arranged in the extension header (L1 extension header) corresponds to the first BB packet of the physical layer frame.

As described above, the periodic transmission information can be arranged and transmitted at the head of the data portion (immediately after the preamble) of the physical layer frame by arranging the periodic transmission information in the extension header (L1 extension header) in the first BB packet of the physical layer frame using the L1 extension header transmission method as a transmission format for transmitting the periodic transmission information. That is, in the physical layer frame, the periodic transmission information can be arranged in an area that is extractable temporally before other information arranged in the data portion.

(5) L1 Signaling Transmission Method

Figure 22:
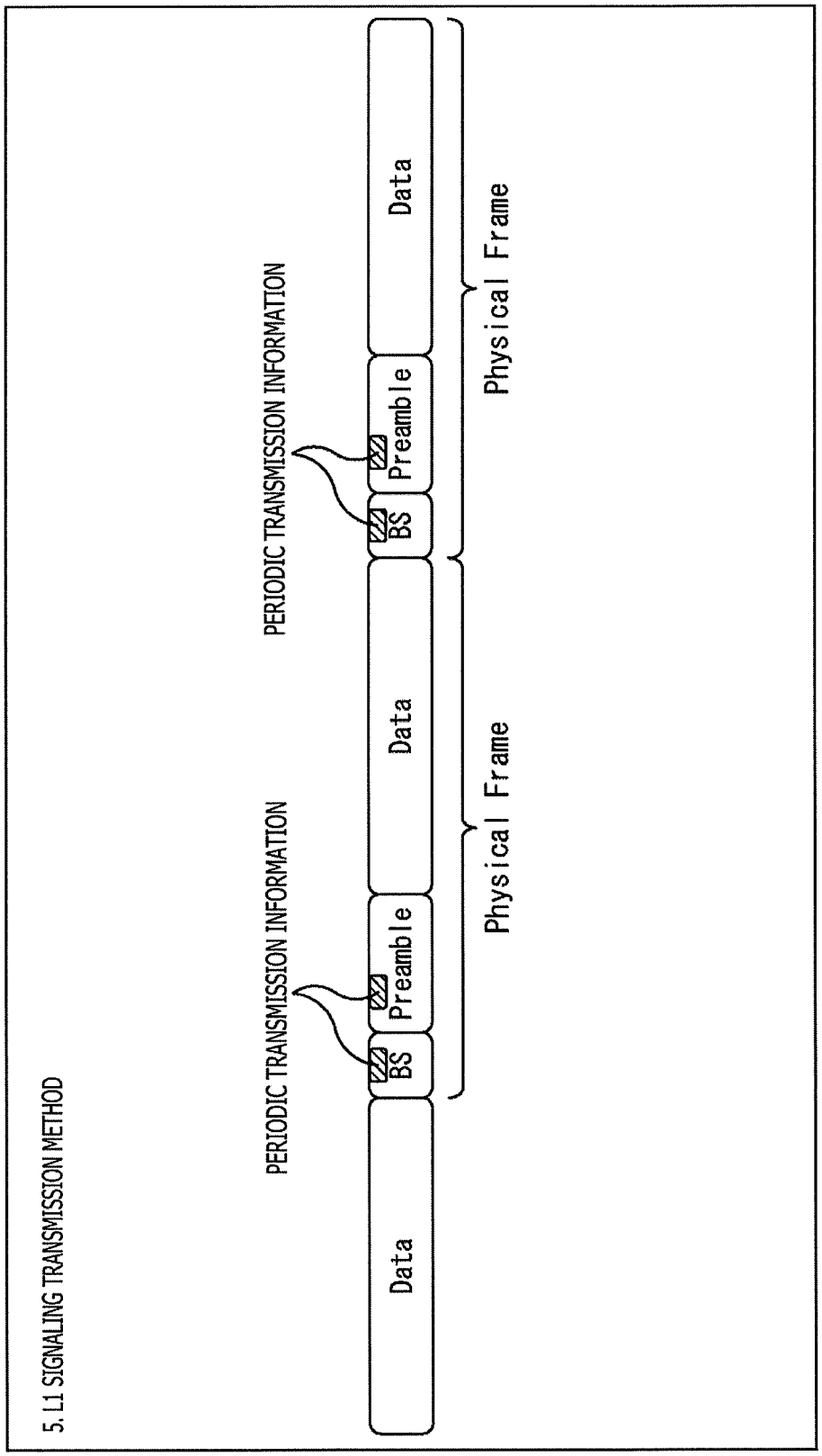
FIG. 22 is a diagram for describing the transmission of the periodic transmission information using an L1 signaling transmission method.

FIG. 22 is a diagram for describing the transmission of the periodic transmission information using the L1 signaling transmission method.

In this L1 signaling transmission method, the periodic transmission information is arranged in the bootstrap or the preamble of a physical layer frame.

Note that in the L1 signaling transmission method, unlike the above-described other transmission methods, the periodic transmission information is not arranged at the head of the data portion (immediately after the preamble) of the physical layer frame, but arranged as the L1 signaling information in the bootstrap or the preamble.

However, even in this case, the periodic transmission information is arranged in the bootstrap or the preamble processed before the data portion in the physical layer frame. As a result, the receiving apparatus 20 can extract the periodic transmission information before other information arranged in the data portion.

As described above, the periodic transmission information can be arranged in an area that is extractable temporally before other information arranged in the data portion in the physical layer frame by arranging the periodic transmission information in the bootstrap or the preamble of the physical layer frame using the L1 signaling transmission method as a transmission format for transmitting the periodic transmission information.

The five transmission methods have been described above as the methods of transmitting the periodic transmission information.

Note that the above description has been made with regard to the case where the periodic transmission information is arranged and transmitted at the head of the data portion (immediately after the preamble) of the physical layer frame using the IP/UDP packet transmission method, the L2 signaling transmission method, the L2 extension header transmission method, or the L1 extension header transmission method and the case where the periodic transmission information is arranged and transmitted in the bootstrap or the preamble of the physical layer frame using the L1 signaling transmission method. However, the periodic transmission information can be transmitted using a method other than these five transmission methods. In short, since the periodic transmission information just needs to be arranged in an area that is extractable temporally before other information arranged in the data portion in the physical layer frame, the periodic transmission information may be arranged in this area using a transmission method other than the above-described five transmission methods.

Further, although the above description has been given of the case where all the pieces of information of the channel selection information, the time information, and the header compression information as the periodic transmission information are arranged in an area that is extractable temporally before other information arranged in the data portion, at least one piece of information among the pieces of periodic transmission information just needs to be arranged in this area. Further, although the time information, the header compression information, and the channel selection information have been described as the periodic transmission information in the above description, other information may be arranged when such information arranged at the head of the data portion (immediately after the preamble) of the physical layer frame or in the bootstrap or the preamble can provide some effect.

Moreover, where a plurality of pieces of information is transmitted as the periodic transmission information, the plurality of pieces of information may be transmitted using transmission methods different from each other. Specifically, for example, where the channel selection information and the time information are transmitted as the periodic transmission information, it is possible to transmit the channel selection information using the IP/UDP packet transmission method, while transmitting the time information using the L1 signaling transmission method.

4. Configuration of Each Apparatus

Next, the detailed configurations of the transmitting apparatus 10 and the receiving apparatus 20 constituting the transmission system 1 in FIG. 1 will be described.
(Configuration of Transmitting Apparatus)
FIG. 23 is a diagram illustrating an exemplary configuration of the transmitting apparatus 10 in FIG. 1.

Figure 23:
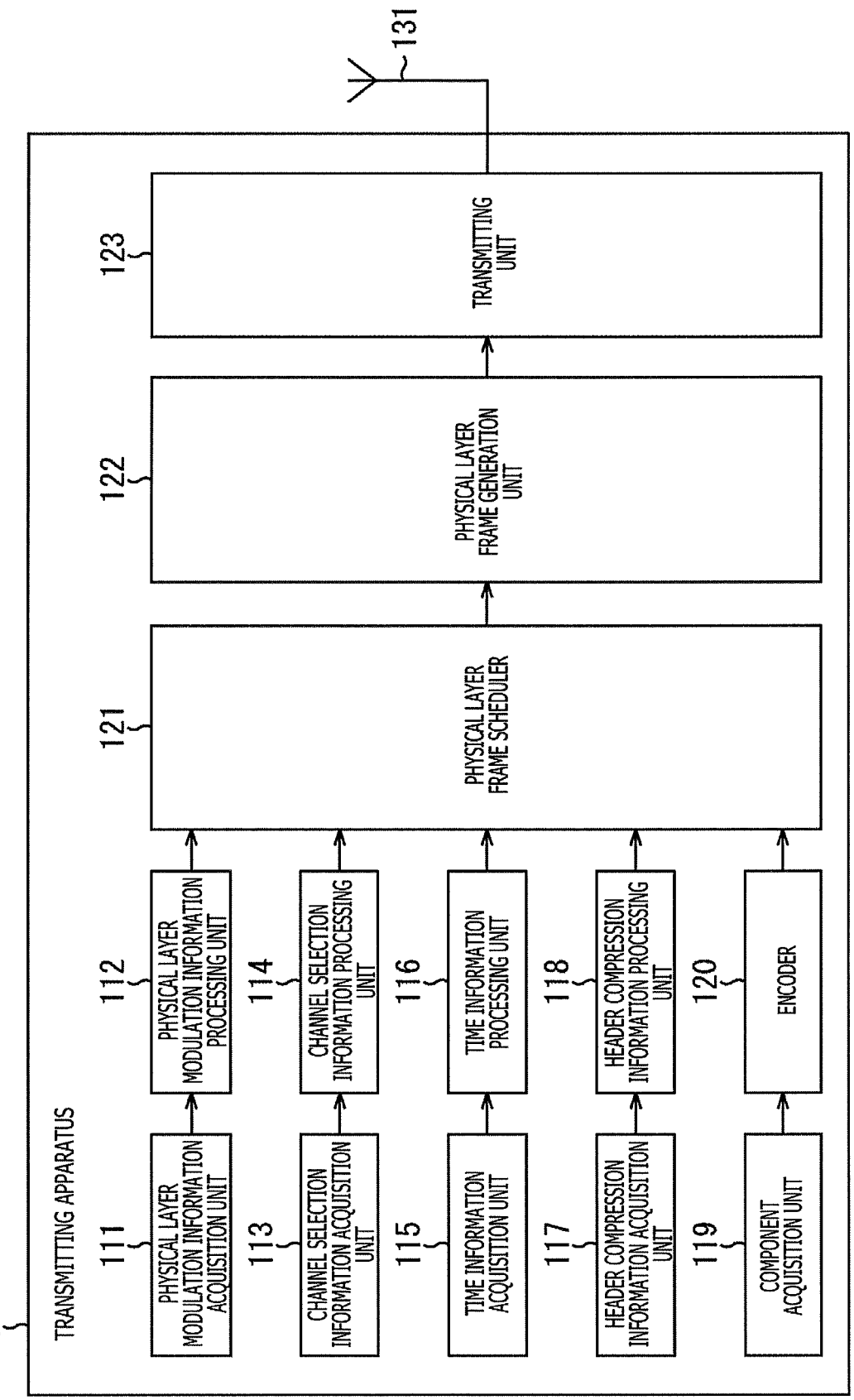
FIG. 23 is a diagram illustrating an exemplary configuration of a transmitting apparatus.

In FIG. 23, the transmitting apparatus 10 includes a physical layer modulation information acquisition unit 111, a physical layer modulation information processing unit 112, a channel selection information acquisition unit 113, a channel selection information processing unit 114, a time information acquisition unit 115, a time information processing unit 116, a header compression information acquisition unit 117, a header compression information processing unit 118, a component acquisition unit 119, the encoder 120, the physical layer frame scheduler 121, a physical layer frame generation unit 122, and a transmitting unit 123.

The physical layer modulation information acquisition unit 111 acquires (generates) physical layer modulation information and supplies the physical layer modulation information to the physical layer modulation information processing unit 112. The physical layer modulation information processing unit 112 processes the physical layer modulation information supplied from the physical layer modulation information acquisition unit 111 and supplies the physical layer modulation information to the physical layer frame scheduler 121. Note that L1 signaling information and the like conforming to ATSC 3.0 are used as the physical layer modulation information, for example.

The channel selection information acquisition unit 113 acquires (generates) channel selection information and supplies the channel selection information to the channel selection information processing unit 114. The channel selection information processing unit 114 processes the channel selection information supplied from the channel selection information acquisition unit 113 and supplies the channel selection information to the physical layer frame scheduler 121. Note that SLT metadata as LLS signaling information is used as the channel selection information, for example.

The time information acquisition unit 115 acquires (generates) time information and supplies the time information to the time information processing unit 116. The time information processing unit 116 processes the time information supplied from the time information acquisition unit 115 and supplies the time information to the physical layer frame scheduler 121. Note that information of time defined by PTP or NTP is used as the time information, for example.

The header compression information acquisition unit 117 acquires (generates) header compression information and supplies the header compression information to the header compression information processing unit 118. The header compression information processing unit 118 processes the header compression information supplied from the header compression information acquisition unit 117 and supplies the header compression information to the physical layer frame scheduler 121. Note that the static information (SC) or the dynamic information (DC) is included as the header compression information.

The component acquisition unit 119 acquires video and audio data as components constituting content (for example, a television program), and supplies the video and audio data to the encoder 120. The encoder 120 encodes the video and audio data supplied from the component acquisition unit 119 according to a predetermined encoding method and supplies the data to the physical layer frame scheduler 121 as a component stream.

Note that as the components, content corresponding to a broadcasting time zone is acquired from a location where already recorded content is stored, or live content is acquired from a studio or a location, for example.

The physical layer modulation information from the physical layer modulation information processing unit 112, the channel selection information from the channel selection information processing unit 114, the time information from the time information processing unit 116, the header compression information from the header compression information processing unit 118, and the component stream from the encoder 120 are supplied to the physical layer frame generation unit 122 via the physical layer frame scheduler 121.

The physical layer frame generation unit 122 generates a physical layer frame (for example, a physical layer frame conforming to ATSC 3.0) including data such as the physical layer modulation information, the channel selection information, the header compression information, the time information, and the component stream, and supplies the physical layer frame to the transmitting unit 123. Note that the physical layer modulation information is arranged in the preamble of the physical layer frame. Further, the data such as the video and audio are arranged in the data portion of the physical layer frame.

Note that when the physical layer frame generation unit 122 generates the physical layer frame, the physical layer frame generation unit 122 generates the physical layer frame such that the periodic transmission information including the channel selection information, the time information, and the header compression information is arranged at the head of the data portion (immediately after the preamble) or in the bootstrap or the preamble in the physical layer frame according to the management by the physical layer frame scheduler 121. Specifically, the following five patterns of processes are performed according to the above-described five transmission methods.

First, in a case where the IP/UDP packet transmission method is used, the physical layer frame scheduler 121 controls the physical layer frame generation unit 122 and arranges an IP/UDP packet including the periodic transmission information in the payload of the first ALS packet in the first BB packet of the physical layer frame such that the periodic transmission information is arranged at the head of the data portion (payload) (immediately after the preamble) of the physical layer frame.

Second, in a case where the L2 signaling transmission method is used, the physical layer frame scheduler 121 arranges L2 signaling information including the periodic transmission information in the payload of the first ALS packet in the first BB packet of the physical layer frame such that the periodic transmission information is arranged at the head of the data portion (payload) (immediately after the preamble) of the physical layer frame.

Third, in a case where the L2 extension header transmission method is used, the physical layer frame scheduler 121 arranges the periodic transmission information in the extension header (L2 extension header) of the first ALP packet in the first BB packet of the physical layer frame such that the periodic transmission information is arranged at the head of the data portion (payload) (immediately after the preamble) of the physical layer frame.

Fourth, in a case where the L1 extension header transmission method is used, the physical layer frame scheduler 121 arranges the periodic transmission information in the extension header (L1 extension header) of the first BB packet of the physical layer frame such that the periodic transmission information is arranged at the head of the data portion (payload) (immediately after the preamble) of the physical layer frame.

Fifth, in a case where the L1 signaling transmission method is used, the physical layer frame scheduler 121 arranges the periodic transmission information in the bootstrap or the preamble of the physical layer frame.

The transmitting unit 123 transmits the physical layer frame generated by the physical layer frame generation unit 122 as a digital broadcast signal through an antenna 131.

The transmitting apparatus 10 is configured as described above. Note that in the transmitting apparatus 10 illustrated in FIG. 23, all the functional blocks do not need to be arranged in a physically single apparatus, and at least a part of the functional blocks may be configured as an apparatus physically independent from the other functional blocks.

(Configuration of Receiving Apparatus)

Figure 24:
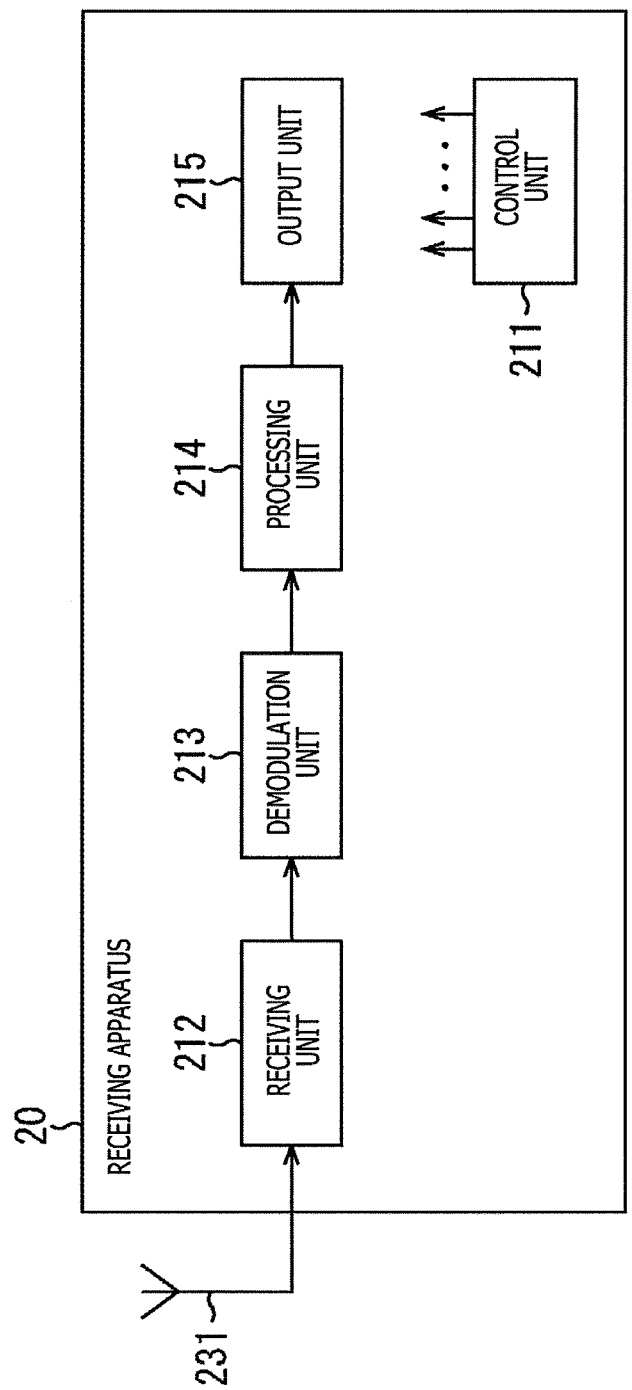
FIG. 24 is a diagram illustrating an exemplary configuration of a receiving apparatus.

FIG. 24 is a diagram illustrating an exemplary configuration of the receiving apparatus 20 in FIG. 1.

In FIG. 24, the receiving apparatus 20 includes a control unit 211, a receiving unit 212, a demodulation unit 213, a processing unit 214, and an output unit 215.

The control unit 211 controls the operation of each unit of the receiving apparatus 20.

The receiving unit 212 receives a digital broadcast signal through an antenna 231, converts the frequency of an RF (Radio Frequency) signal into an IF (Intermediate Frequency) signal, and supplies the signal to the demodulation unit 213. Note that the receiving unit 212 is configured as, for example, an RF IC.

The demodulation unit 213 performs a demodulation process on the physical frame (for example, a physical layer frame conforming to ATSC 3.0) that is a signal supplied from the receiving unit 212 and received as the digital broadcast signal. Further, the demodulation unit 213 performs an error correction process on the demodulated signal acquired by the demodulation process, and supplies the signal acquired as the result of the process to the processing unit 214. Note that the demodulation unit 213 is configured as, for example, a demodulation LSI (Large Scale Integration).

Here, when the demodulation unit 213 performs the demodulation process, the demodulation unit 213 acquires (extracts) and processes the periodic transmission information arranged at the head of the data portion (immediately after the preamble) or in the bootstrap or the preamble in the physical layer frame. Specifically, the following five patterns of processes are performed according to the above-described five transmission methods.

First, where the IP/UDP packet transmission method is used, the demodulation unit 213 extracts the IP/UDP packet including the periodic transmission information arranged in the payload of the first ALS packet in the first BB packet of the physical layer frame, thereby extracting the periodic transmission information from the head of the data portion (payload) (immediately after the preamble) of the physical layer frame.

Second, where the L2 signaling transmission method is used, the demodulation unit 213 extracts the L2 signaling information including the periodic transmission information arranged in the payload of the first ALS packet in the first BB packet of the physical layer frame, thereby extracting the periodic transmission information from the head of the data portion (payload) (immediately after the preamble) of the physical layer frame.

Third, where the L2 extension header transmission method is used, the demodulation unit 213 extracts the periodic transmission information arranged in the extension header (L2 extension header) of the first ALP packet in the first BB packet of the physical layer frame, thereby extracting the periodic transmission information from the head of the data portion (payload) (immediately after the preamble) of the physical layer frame.

Fourth, where the L1 extension header transmission method is used, the demodulation unit 213 extracts the periodic transmission information arranged in the extension header (L1 extension header) of the first BB packet of the physical layer frame, thereby extracting the periodic transmission information from the head of the data portion (payload) (immediately after the preamble) of the physical layer frame.

Fifth, where the L1 signaling transmission method is used, the demodulation unit 213 extracts the periodic transmission information from the bootstrap or the preamble of the physical layer frame.

The processing unit 214 performs a process (for example, a decoding process and the like) on the signal supplied from the demodulation unit 213, and supplies the video and audio data acquired as a result of the process to the output unit 215. Further, where the periodic transmission information such as the channel selection information, the time information, the header compression information, or the like is extracted by the demodulation unit 213, the processing unit 214 (or the control unit 211) performs a process corresponding to the periodic transmission information. Note that the processing unit 214 is configured as, for example, a main SoC (System on Chip).

The output unit 215 includes, for example, a display unit and a speaker. The display unit displays a video corresponding to the video data supplied from the processing unit 214. Further, the speaker outputs audio corresponding to the audio data supplied from the processing unit 214. Note that the output unit 215 may output the video and audio data supplied from the processing unit 214 to external equipment.

The receiving apparatus 20 is configured as described above. Note that the receiving apparatus 20 may be a fixed receiver such as a television receiver, a set top box (STB: Set Top Box), or a video recorder, or may be a mobile receiver such as a mobile phone, a smartphone, or a tablet terminal. Further, the receiving apparatus 20 may be in-vehicle equipment mounted in a vehicle.

5. Flow of Processes Executed by Each Apparatus

Figure 25:
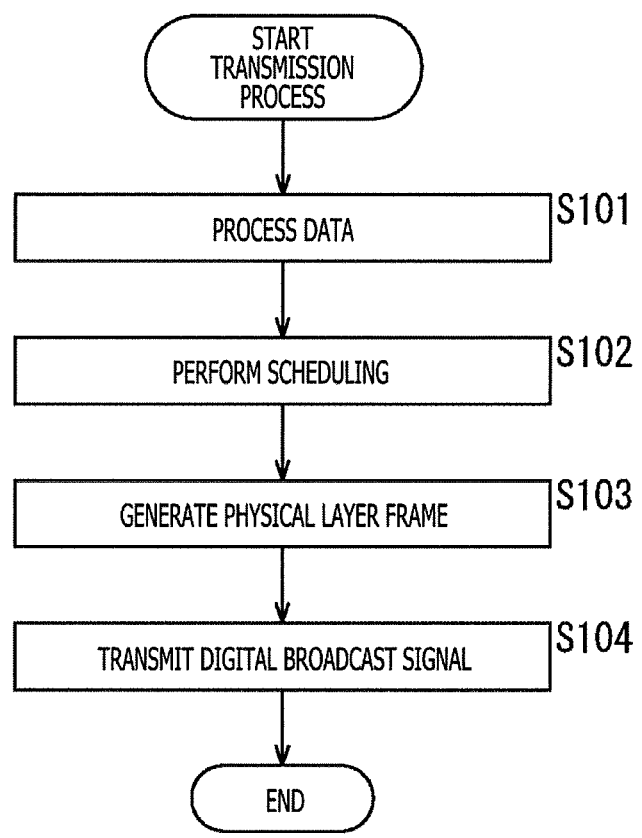
FIG. 25 is a flowchart for describing a flow of a transmission process.
Figure 26:
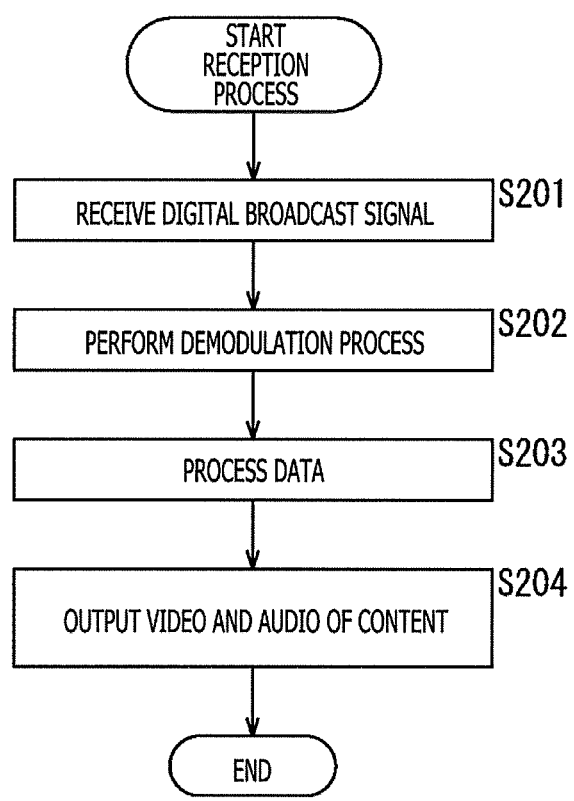
FIG. 26 is a flowchart for describing a flow of a reception process.

Next, the flow of the process executed by each apparatus constituting the transmission system 1 in FIG. 1 will be described with reference to the flowcharts in FIGS. 25 and 26.

(Transmission Process)

First, the flow of the transmission process executed by the transmitting apparatus 10 in FIG. 1 will be described with reference to the flowchart in FIG. 25.

In step S101, data processing is performed. In this data processing, the physical layer modulation information is processed by the physical layer modulation information acquisition unit 111 and the physical layer modulation information processing unit 112.

Further, in this data processing, processes on the channel selection information by the channel selection information acquisition unit 113 and the channel selection information processing unit 114, processes on the time information by the time information acquisition unit 115 and the time information processing unit 116, processes on the header compression information by the header compression information acquisition unit 117 and the header compression information processing unit 118, and processes on components by the component acquisition unit 119 and the encoder 120 are performed.

In step S102, the physical layer frame scheduler 121 controls the physical layer frame generation unit 122 to perform a scheduling process for a physical layer frame.

In step S103, the physical layer frame generation unit 122 generates the physical layer frame according to the above-described five transmission methods (the IP/UDP packet transmission method, the L2 signaling transmission method, the L2 extension header transmission method, the L1 extension header transmission method, or the L1 signaling transmission method) following the process (control by the physical layer frame scheduler 121) in step S102. In this physical layer frame, the periodic transmission information including the channel selection information, the time information, and the header compression information is arranged at the head of the data portion (immediately after the preamble) or in the bootstrap or the preamble.

In step S104, the transmitting unit 123 transmits the physical layer frame generated by the process in step S103 as a digital broadcast signal through the antenna 131. When the process in step S104 ends, the transmission process in FIG. 25 ends.

The flow of the transmission process has been described above. In this transmission process, the physical layer frame is generated such that the periodic transmission information is arranged at the head of the data portion (immediately after the preamble) or in the bootstrap or the preamble in the physical layer frame according to any one of the IP/UDP packet transmission method, the L2 signaling transmission method, L2 extension header transmission method, the L1 extension header transmission method, and the L1 signaling transmission method, which is then transmitted as the digital broadcast signal.

(Reception Process)

Next, the flow of a reception process executed by the receiving apparatus 20 in FIG. 1 will be described with reference to the flowchart in FIG. 26.

In step S201, the receiving unit 212 receives, through the antenna 231, the digital broadcast signal transmitted from the transmitting apparatus 10 via the transmission path 30.

In step S202, the demodulation unit 213 performs a demodulation process on the physical layer frame received as the digital broadcast signal through the process in step S201. In this demodulation process, the demodulation process for the physical layer frame is performed using the physical layer modulation information, for example. Further, since the periodic transmission information including the channel selection information, the time information, and the header compression information is arranged at the head of the data portion (immediately after the preamble) or in the bootstrap or the preamble in the physical layer frame according to the above-described five transmission methods (the IP/UDP packet transmission method, the L2 signaling transmission method, the L2 extension header transmission method, the L1 extension header transmission method, or the L1 signaling transmission method), the periodic transmission information is extracted and processed through this demodulation process.

In step S203, the processing unit 214 performs a process (for example, decoding process) on the signal (data) acquired by the process in step S202. Further, where the periodic transmission information such as the channel selection information, the time information, or the header compression information is extracted by the process in step S202, the control unit 211 or the processing unit 214 performs a process corresponding to the periodic transmission information.

In step S204, the output unit 215 outputs the video and audio of content such as a television program according to the video and audio data acquired through the process in step S203. When the process in step S204 ends, the reception process in FIG. 26 ends.

The flow of the reception process has been described above. In this reception process, the digital broadcast signal is received from the transmitting apparatus 10 and the periodic transmission information arranged at the head of the data portion (immediately after the preamble) or in the bootstrap or the preamble in the physical layer frame is extracted according to any one of the IP/UDP packet transmission method, the L2 signaling transmission method, the L2 extension header transmission method, the L1 extension header transmission method, or the L1 signaling transmission method. This enables the channel selection process to speed up using the channel selection information and the highly-precise time information to be transmitted, for example.

Specifically, for example, after (the demodulation unit 213 of) the receiving apparatus 20 processes the preamble of the physical layer frame, the receiving apparatus 20 promptly extracts the channel selection information (periodic transmission information) from the head of the data portion (immediately after the preamble) transmitted subsequently. This enables speeding up of the channel selection process executed by the control unit 211 to the processing unit 214.

Further, for example, after (the demodulation unit 213 of) the receiving apparatus 20 processes the preamble of the physical layer frame transmitted in a certain period, the receiving apparatus 20 extracts the time information (periodic transmission information) mapped to the head of the data portion (immediately after the preamble) transmitted subsequently. This ensures synchronization (presentation synchronization) of videos and audio using the time information with high precision by the control unit 211, the processing unit 214, and the like.

6. Modification

Although ATSC (ATSC 3.0 in particular), which is the method employed in the United States of America and the like, has been described as the standard of the digital broadcasting in the above description, the present technology may be applied to the ISDB (Integrated Services Digital Broadcasting), the DVB (Digital Video Broadcasting), or the like. The ISDB is the method employed in Japan and the like. The DVB is the method employed in European countries and the like. Further, although ATSC 3.0 that employs the IP transmission method has been described as an example in the above description, the present technology may be applied to other methods such as, for example, the MPEG2-TS method, without limiting to the IP transmission method.

Further, the present technology can be applied to satellite broadcasting using broadcasting satellites (BSs), communications satellites (CSs), or the like, cable broadcasting such as cable television (CATV), and the like, in addition to the terrestrial broadcasting, as the digital broadcasting.

The names of the above-described signaling information, packets, and the like are merely examples and other names may be used. Note that the difference in these names is merely a formal difference, and the substantial contents of the target signaling information, packets, and the like are not different. For example, a BB packet (Baseband Packet) may be referred to as a BB stream (Baseband Stream) or a BB frame (Baseband Frame). Further, for example, an ALP (ATSC Link-layer Protocol) packet may also be referred to as a Generic packet.

In the above description, information of time defined by PTP and NTP has been mainly described as the time information. However, without limiting thereto, it is possible to use any time information such as time information defined by UTC (coordinated universal time), local time (LT: Local Time) that is the time at the standard time of each time zone, time information defined by the 3GPP (Third Generation Partnership Project), time information included in GPS (Global Positioning System) information, or time information in other uniquely determined format.

Note that the present technology can also be applied to prescribed standards (standards other than digital broadcasting standards) and the like that are defined assuming the use of transmission paths other than the broadcasting networks as transmission paths, that is, communication lines (communication networks) such as the Internet and telephone networks, for example. In this case, a communication line such as the Internet or a telephone network can be used as the transmission path 30 of the transmission system 1 (FIG. 1), while the transmitting apparatus 10 can serve as a server provided on the Internet. Then, by including a communication function in the receiving apparatus 20, the transmitting apparatus 10 (server) performs processes in response to a request from the receiving apparatus 20. Further, the receiving apparatus 20 processes data transmitted from the transmitting apparatus 10 (server) via the transmission path 30 (communication line).

7. Computer Configuration

Figure 27:
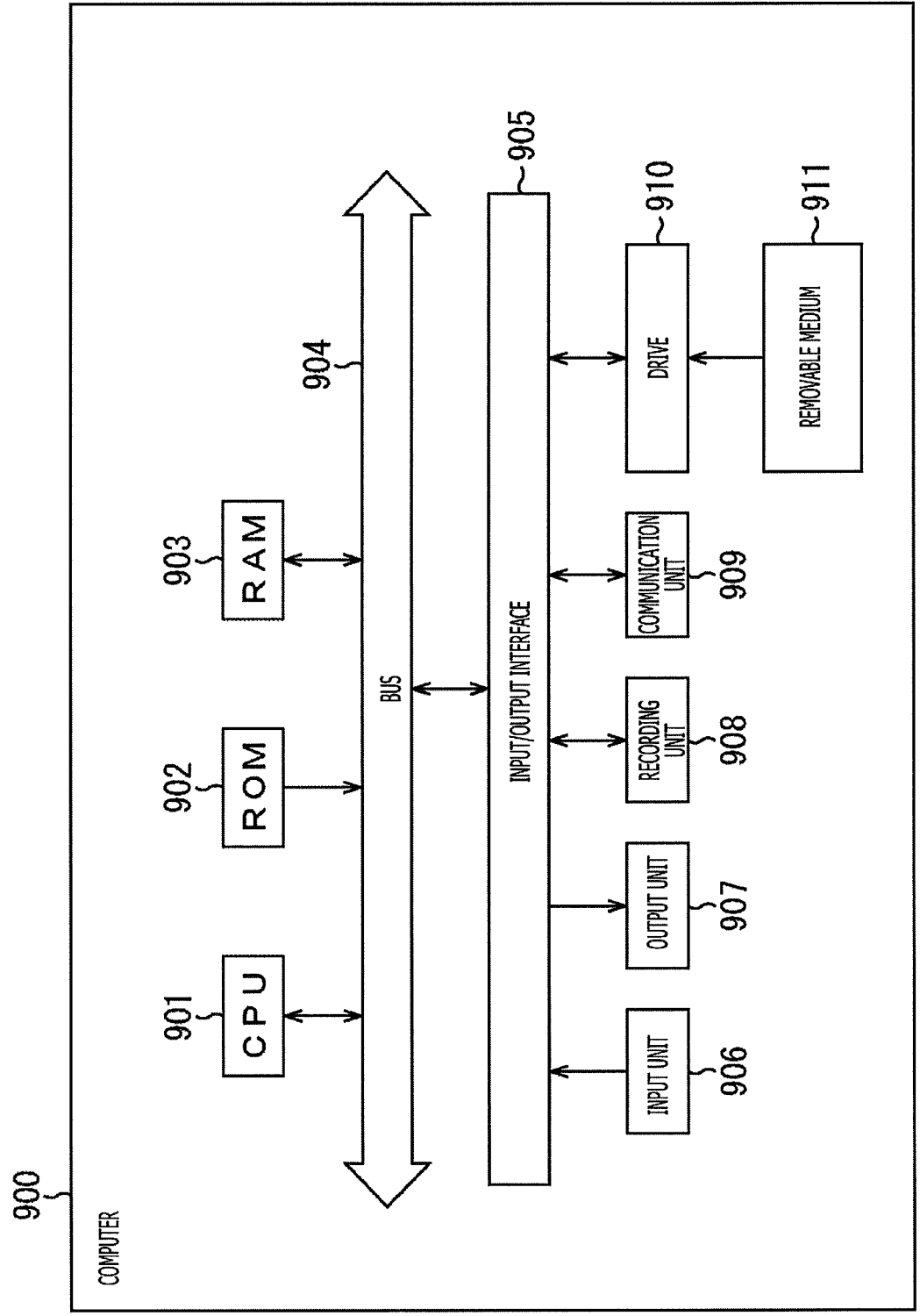
FIG. 27 is a diagram illustrating an exemplary configuration of a computer.

The above-described series of processes can be executed by hardware or software. Where the series of processes are to be executed by software, a program constituting the software is installed in a computer. FIG. 27 is a diagram illustrating an exemplary hardware configuration of the computer in which the program executes the series of processes described above.

In a computer 900, a CPU (Central Processing Unit) 901, a ROM (Read Only Memory) 902, and a RAM (Random Access Memory) 903 are connected to each other via a bus 904. Additionally, an input/output interface 905 is connected to the bus 904. An input unit 906, an output unit 907, a recording unit 908, a communication unit 909, and a drive 910 are connected to the input/output interface 905.

The input unit 906 includes a keyboard, a mouse, a microphone, and the like. The output unit 907 includes a display, a speaker, and the like. The recording unit 908 includes a hard disk, non-volatile memory, and the like. The communication unit 909 includes a network interface and the like. The drive 910 drives a removable medium 911 such as a magnetic disk, an optical disk, a magneto-optical disk, semiconductor memory, or the like.

In the computer 900 configured as above, the CPU 901 loads the program recorded in the ROM 902 or the recording unit 908 into the RAM 903 via the input/output interface 905 and the bus 904 and executes the program, through which the above-described series of processes are performed.

The program to be executed by the computer 900 (CPU 901) can be recorded and provided on the removable medium 911 as a package medium, for example. Further, the program can be provided via a wired or wireless transmission medium such as a local area network, the Internet, or digital satellite broadcasting.

In the computer 900, the program can be installed in the recording unit 908 via the input/output interface 905 by attaching the removable medium 911 to the drive 910. Further, the program can be received by the communication unit 909 via a wired or wireless transmission medium and installed in the recording unit 908. Additionally, the program can be installed in advance in the ROM 902 or the recording unit 908.

Here, the processes performed by the computer in accordance with the program in the present specification are not necessarily performed in the time sequence in the order described as the flowcharts. That is, the processes performed by the computer in accordance with the program also include processes that are executed in parallel or individually (e.g., a parallel process or a process by an object). Further, the program may be processed by a single computer (processor) or by a plurality of computers in a distributed manner.

Note that the embodiments of the present technology are not limited to the above-described embodiment and various modifications can be made without departing from the gist of the present technology.

Further, the present technology can be configured as follows.

(1)

A transmitting apparatus including:

a processing unit that arranges, in a physical layer frame including a preamble and a data portion, periodically transmitting transmission information in an area that is extractable temporally before other information arranged in the data portion; and a transmitting unit that transmits the physical layer frame as a digital broadcast signal.

(2)

The transmitting apparatus according to (1), in which the transmission information is arranged immediately after the preamble and at a head of the data portion.

(3)

The transmitting apparatus according to (1) or (2), in which the transmission information includes at least one piece of information among time information for synchronizing a transmitting side and a receiving side, header compression information for compressing header information of a packet, and channel selection information for selecting a service.

(4)

The transmitting apparatus according to (3), in which the time information, the header compression information, and the channel selection information are arranged in this order in the data portion.

(5)

The transmitting apparatus according to (1), in which, in the physical layer frame, the data portion includes one or a plurality of PLPs (Physical Layer Pipes), and the transmission information corresponding to each PLP is arranged at a head of each PLP.

(6)

The transmitting apparatus according to any one of (2) to (5), in which the transmission information is arranged in a payload of an IP (Internet Protocol) packet including a UDP (User Datagram Protocol) packet.

(7)

The transmitting apparatus according to any one of (2) to (5), in which the transmission information is arranged in a payload of a first transmission packet for transmitting an IP packet including a UDP packet, an extension header of the first transmission packet, or an extension header of a second transmission packet for transmitting the first transmission packet.

(8)

The transmitting apparatus according to (1), in which the physical layer frame further includes a bootstrap in which the transmission information is arrangeable, and the transmission information is arranged in the bootstrap or the preamble.

(9)

A data processing method for a transmitting apparatus, the data processing method including the steps of:

by the transmitting apparatus, arranging, in a physical layer frame including a preamble and a data portion, periodically transmitting transmission information in an area that is extractable temporally before other information arranged in the data portion; and transmitting the physical layer frame as a digital broadcast signal.

(10)

A receiving apparatus including:

a receiving unit that receives a physical layer frame transmitted as a digital broadcast signal and including a preamble and a data portion; and a processing unit that performs a process corresponding to transmission information periodically transmitted and arranged in an area that is extractable temporally before other information arranged in the data portion in the physical layer frame.

(11)

The receiving apparatus according to (10), in which the transmission information is arranged immediately after the preamble and at a head of the data portion.

(12)

The receiving apparatus according to (10) or (11), in which the transmission information includes at least one piece of information among time information for synchronizing a transmitting side and a receiving side, header compression information for compressing header information of a packet, and channel selection information for selecting a service.

(13)

The receiving apparatus according to (12), in which the time information, the header compression information, and the channel selection information are arranged in this order in the data portion.

(14)

The receiving apparatus according to (10), in which, in the physical layer frame, the data portion includes one or a plurality of PLPs, and the transmission information corresponding to each PLP is arranged at a head of each PLP.

(15)

The receiving apparatus according to any one of (11) to (14), in which the transmission information is arranged in a payload of an IP packet including a UDP packet.

(16)

The receiving apparatus according to any one of (11) to (14), in which the transmission information is arranged in a payload of a first transmission packet for transmitting an IP packet including a UDP packet, an extension header of the first transmission packet, or an extension header of a second transmission packet for transmitting the first transmission packet.

(17)

The receiving apparatus according to (10), in which the physical layer frame further includes a bootstrap in which the transmission information is arrangeable, and the transmission information is arranged in the bootstrap or the preamble.

(18)

A data processing method for a receiving apparatus, the data processing method including the steps of:

by the receiving apparatus, receiving a physical layer frame transmitted as a digital broadcast signal and including a preamble and a data portion; and performing a process corresponding to transmission information periodically transmitted and arranged in an area that is extractable temporally before other information arranged in the data portion in the physical layer frame.

REFERENCE SIGNS LIST

1 Transmission system, 10 Transmitting apparatus, 20 Receiving apparatus, 30 Transmission path, 111 Physical layer modulation information acquisition unit, 112 Physical layer modulation information processing unit, 113 Channel selection information acquisition unit, 114 Channel selection information processing unit, 115 Time information acquisition unit, 116 Time information processing unit, 117 Header compression information acquisition unit, 118 Header compression information processing unit, 119 Component acquisition unit, 120 Encoder, 121 Physical layer frame scheduler, 122 Physical layer frame generation unit, 123 Transmitting unit, 211 Control unit, 212 Receiving unit, 213 Demodulation unit, 214 Processing unit, 215 Output unit, 900 Computer, 901 CPU

The invention claimed is:

1. A transmitting apparatus comprising:
a processor configured to arrange, in a physical layer frame including a preamble and a data portion, transmission information immediately after the preamble and at a head of the data portion as an area that is extractable temporally before other information arranged in the data portion; and
a transmitter configured to transmit the physical layer frame as a digital broadcast signal,
wherein the transmission information includes pieces of information among at least two of
time information for synchronizing a transmitting side and a receiving side,
header compression information for compressing header information of a packet, and
channel selection information for selecting a service, and
the pieces of information are ordered in the data portion as follows,
the time information, then the header compression information, and then the channel selection information.

2. The transmitting apparatus according to claim 1,
wherein, in the physical layer frame,
the data portion includes one or a plurality of PLPs (Physical Layer Pipes), and
the transmission information corresponding to each PLP is arranged at a head of each PLP.

3. The transmitting apparatus according to claim 1,
wherein the transmission information is arranged in a payload of an IP (Internet Protocol) packet including a UDP (User Datagram Protocol) packet.

4. The transmitting apparatus according to claim 1,
wherein the transmission information is arranged in a payload of a first transmission packet for transmitting an IP packet including a UDP packet, an extension header of the first transmission packet, or an extension header of a second transmission packet for transmitting the first transmission packet.

5. The transmitting apparatus according to claim 1,
wherein the physical layer frame further includes a bootstrap, and
the transmission information is arranged in the bootstrap.

6. A data processing method for a transmitter, the data processing method comprising:
by the transmitter,
arranging, in a physical layer frame including a preamble and a data portion, transmission information immediately after the preamble and at a head of the data portion as an area that is extractable temporally before other information arranged in the data portion; and
transmitting the physical layer frame as a digital broadcast signal,
wherein the transmission information includes pieces of information among at least two of
time information for synchronizing a transmitting side and a receiving side,
header compression information for compressing header information of a packet, and
channel selection information for selecting a service, and
the pieces of information are ordered in the data portion as follows,
the time information, then the header compression information, and then the channel selection information.

7. A receiving apparatus comprising:
a receiver configured to receive a physical layer frame transmitted as a digital broadcast signal and including a preamble and a data portion; and
a processor configured to perform a process corresponding to transmission information arranged immediately after the preamble and at a head of the data portion as an area that is extractable temporally before other information arranged in the data portion in the physical layer frame,
wherein the transmission information includes pieces of information among at least two of
time information for synchronizing a transmitting side and a receiving side,
header compression information for compressing header information of a packet, and
channel selection information for selecting a service, and
the pieces of information are ordered in the data portion as follows,
the time information, then the header compression information, and then the channel selection information.

8. The receiving apparatus according to claim 7,
wherein, in the physical layer frame,
the data portion includes one or a plurality of PLPs, and
the transmission information corresponding to each PLP is arranged at a head of each PLP.

9. The receiving apparatus according to claim 7,
wherein the transmission information is arranged in a payload of an IP packet including a UDP packet.

10. The receiving apparatus according to claim 7,
wherein the transmission information is arranged in a payload of a first transmission packet for transmitting an IP packet including a UDP packet, an extension header of the first transmission packet, or an extension header of a second transmission packet for transmitting the first transmission packet.

11. The receiving apparatus according to claim 7,
wherein the physical layer frame further includes a bootstrap, and
the transmission information is arranged in the bootstrap.

12. A data processing method for a receiver, the data processing method comprising:
by the receiver,
receiving a physical layer frame transmitted as a digital broadcast signal and including a preamble and a data portion; and
performing a process corresponding to transmission information arranged immediately after the preamble and at a head of the data portion as an area that is extractable temporally before other information arranged in the data portion in the physical layer frame,
wherein the transmission information includes pieces of information among at least two of time information for synchronizing a transmitting side and a receiving side,
header compression information for compressing header information of a packet, and
channel selection information for selecting a service, and the pieces of information are ordered in the data portion as follows,
the time information, then the header compression information, and then the channel selection information.

\* \* \* \* \*